(12) United States Patent
Kobayashi et al.

(10) Patent No.: US 8,610,733 B2
(45) Date of Patent: Dec. 17, 2013

(54) IMAGE DISPLAY DEVICE, ELECTRONIC DEVICE, DISPLAY CONTROLLER AND DISPLAY CONTROL METHOD

(75) Inventors: Yoshinao Kobayashi, Kanagawa (JP); Akinori Sato, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 1070 days.

(21) Appl. No.: 12/440,227

(22) PCT Filed: Sep. 5, 2007

(86) PCT No.: PCT/JP2007/067307
§ 371 (c)(1),
(2), (4) Date: Mar. 5, 2009

(87) PCT Pub. No.: WO2008/029844
PCT Pub. Date: Mar. 13, 2008

(65) Prior Publication Data
US 2010/0039437 A1  Feb. 18, 2010

(30) Foreign Application Priority Data
Sep. 6, 2006  (JP) .................................. 2006-241527

(51) Int. Cl.
*G09G 5/36*  (2006.01)
(52) U.S. Cl.
USPC ......................................................... 345/545
(58) Field of Classification Search
USPC ................................................. 345/545–551
See application file for complete search history.

(56) References Cited

U.S. PATENT DOCUMENTS

| 5,500,933 | A | * | 3/1996 | Schnorf | 715/255 |
| 5,812,210 | A | * | 9/1998 | Arai et al. | 348/555 |
| 6,040,889 | A | * | 3/2000 | Takatori et al. | 349/174 |
| 6,288,722 | B1 | * | 9/2001 | Narayanaswami | 345/619 |

(Continued)

FOREIGN PATENT DOCUMENTS

| JP | 62-202275 A | 9/1987 |
| JP | 5-128246 A | 5/1993 |

(Continued)

*Primary Examiner* — Xiao M. Wu
*Assistant Examiner* — Charles Tseng
(74) *Attorney, Agent, or Firm* — Birch, Stewart, Kolasch & Birch, LLP

(57) ABSTRACT

The present invention suppresses a phenomenon in which an oblique line appears on a display screen when the scanning line direction of a moving image is changed in an image memory. To accomplish the above-mentioned object, an image display device includes: a storage portion configured to store image data for a first frame constituting the moving image and for a second frame subsequent to the first frame, and having first to third memory areas; a writing portion configured to write the image data for the first frame into the first and second memory areas and to write the image data for the second frame into the first and third memory areas; a reading portion configured to read the image data for the first frame from the first and second memory areas and to read the image data for the second frame from the first and third memory areas, the reading portion changing a scanning line direction for the image data for the first and second frames to be read to a second scanning line direction different from a first scanning line direction that is a scanning line direction for the image data prior to the writing; and a display portion configured to output the image data for the read first and second frames in time sequence in a visible manner.

14 Claims, 21 Drawing Sheets

(56) References Cited

U.S. PATENT DOCUMENTS

| | | | |
|---|---|---|---|
| 6,411,302 B1* | 6/2002 | Chiraz | 345/545 |
| 6,580,233 B2* | 6/2003 | Nakanishi et al. | 315/383 |
| 6,765,580 B2* | 7/2004 | Champion | 345/545 |
| 7,174,051 B2* | 2/2007 | Kondo et al. | 382/299 |
| 7,489,361 B2* | 2/2009 | Matsuzaki et al. | 348/458 |
| 7,623,125 B2* | 11/2009 | Harada | 345/211 |
| 2002/0181763 A1* | 12/2002 | Kondo et al. | 382/154 |
| 2004/0252139 A1 | 12/2004 | Takizawa et al. | |

FOREIGN PATENT DOCUMENTS

| | | |
|---|---|---|
| JP | 7-146932 A | 6/1995 |
| JP | 10-208032 A | 8/1998 |
| JP | 10-307576 A | 11/1998 |
| JP | 11-69135 A | 3/1999 |
| JP | 2003-114649 A | 4/1999 |
| JP | 2002-82349 A | 3/2002 |
| JP | 2004-56287 A | 2/2004 |
| JP | 2004-282526 A | 10/2004 |
| JP | 2004-333957 A | 11/2004 |

* cited by examiner

FIG. 3
(R1) READING
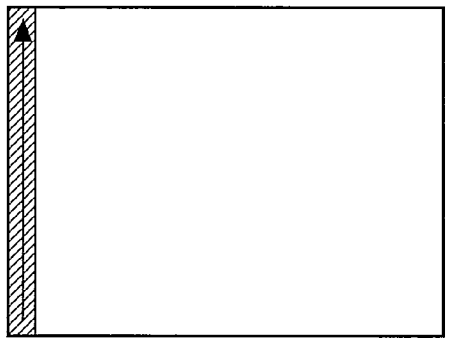
(W1) WRITING
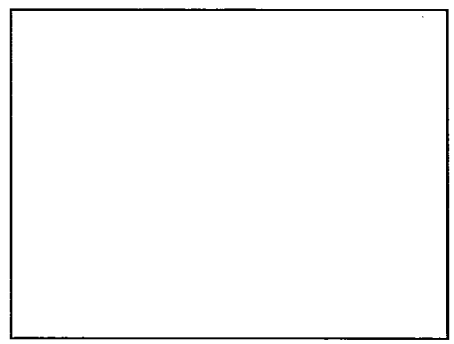
(R2) READING
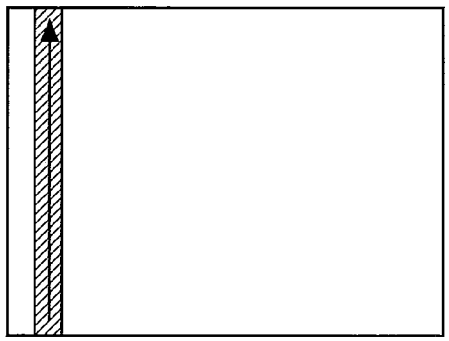
(W2) WRITING
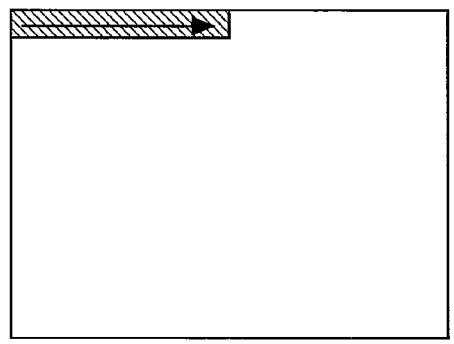
(R3) READING
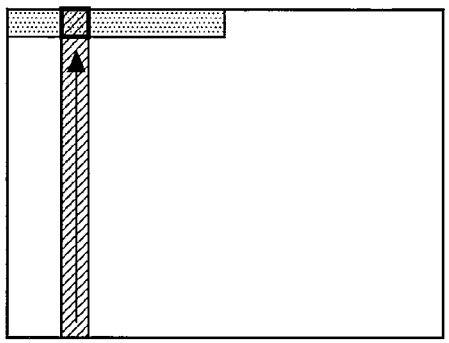
(W3) WRITING
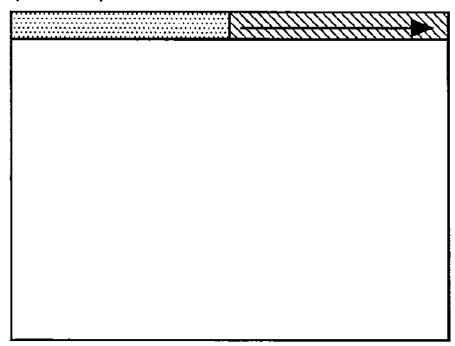
(R4) READING
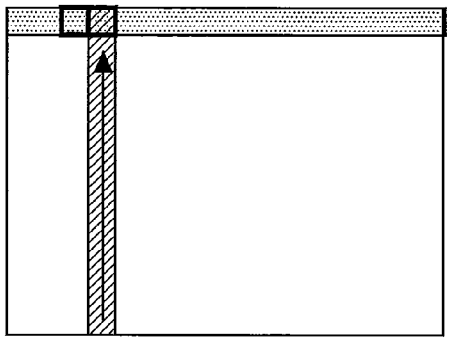
(W4) WRITING
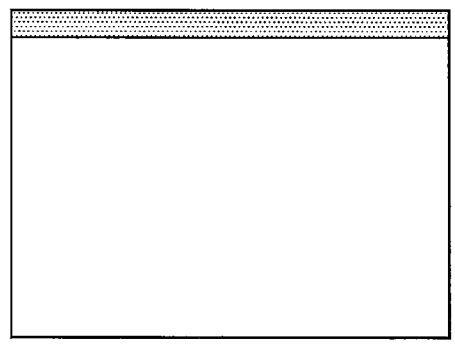

F I G . 4
(R5) READING
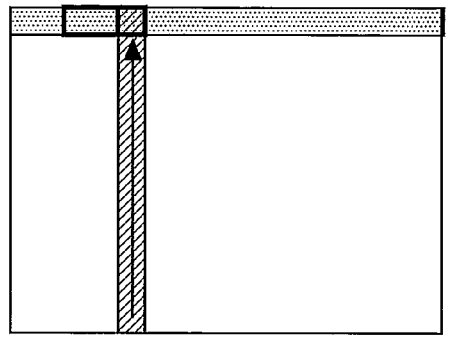
(W5) WRITING
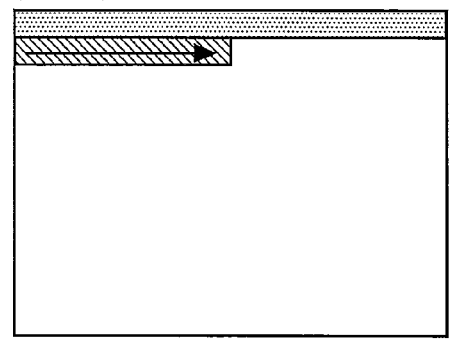
(R6) READING
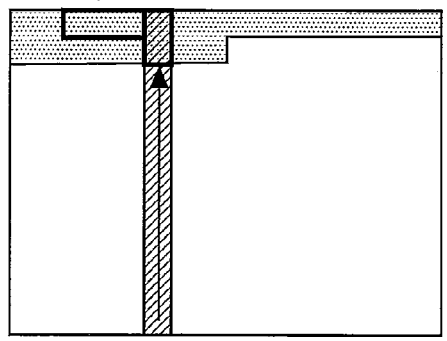
(W6) WRITING
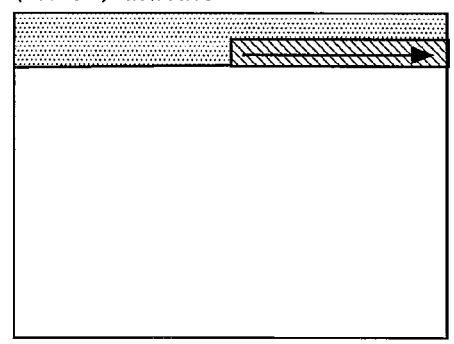
(R7) READING
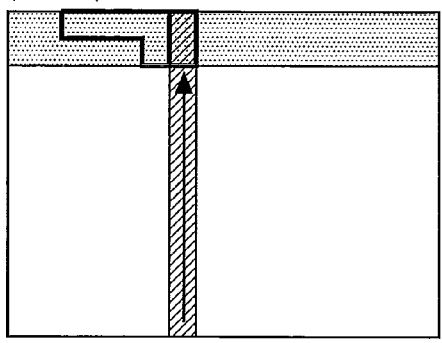
(W7) WRITING
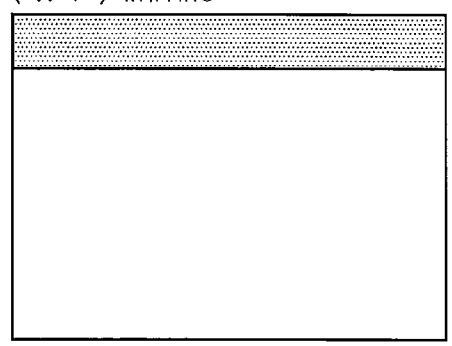
(R8) READING
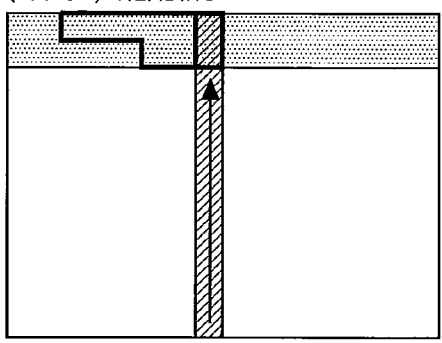
(W8) WRITING
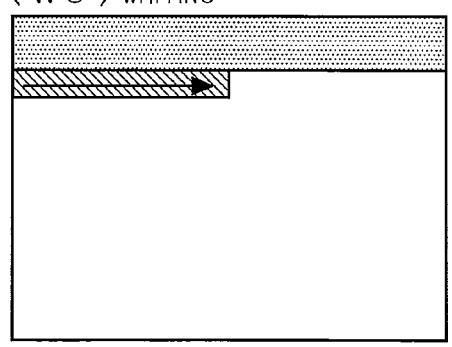

FIG. 5
(R9) READING
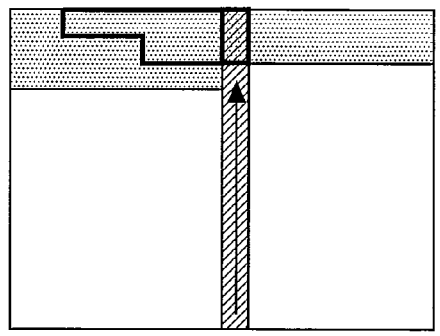
(W9) WRITING
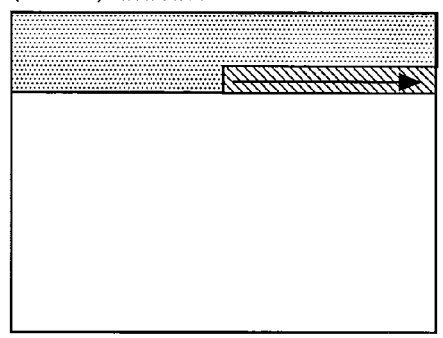
(R10) READING
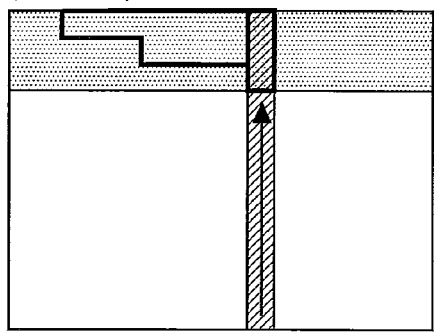
(W10) WRITING
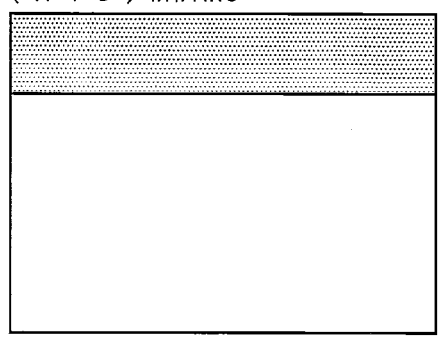
(R11) READING
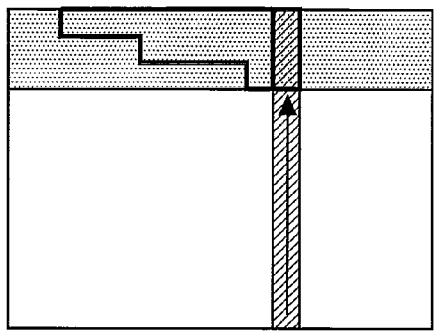
(W11) WRITING
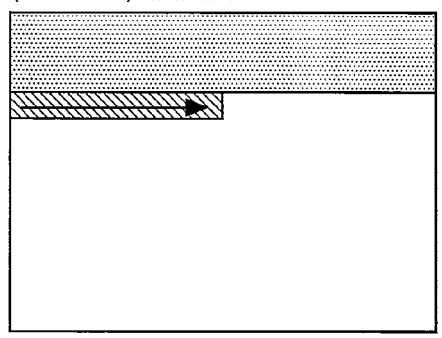
(R12) READING
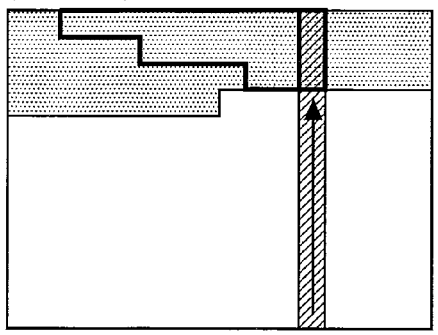
(W12) WRITING
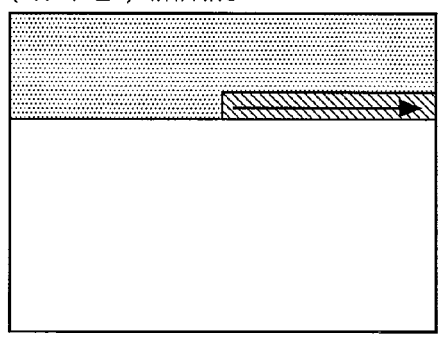

F I G . 6
(R13) READING
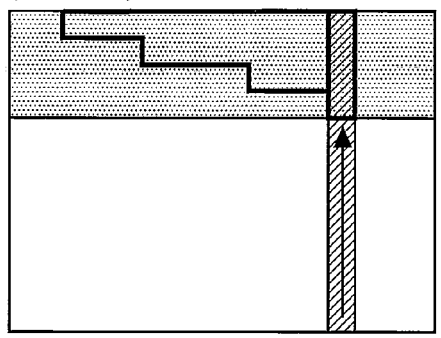
(W13) WRITING
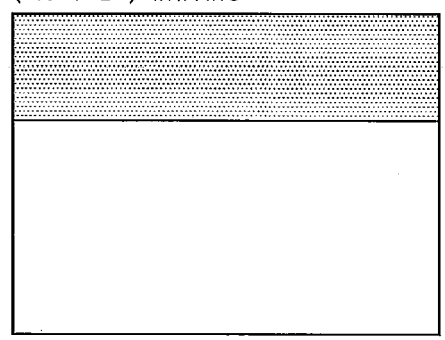
(R14) READING
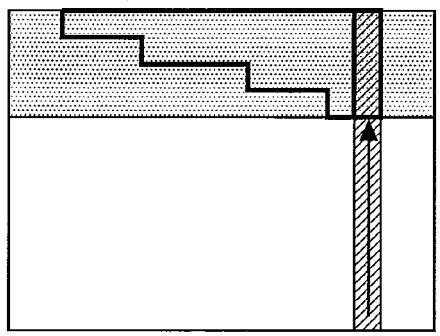
(W14) WRITING
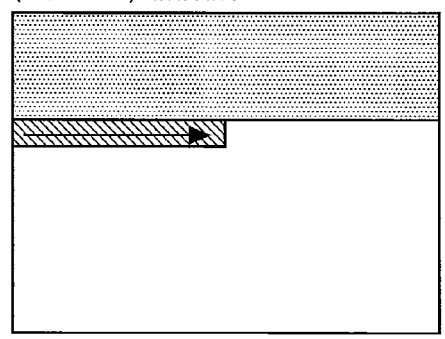
(R15) READING
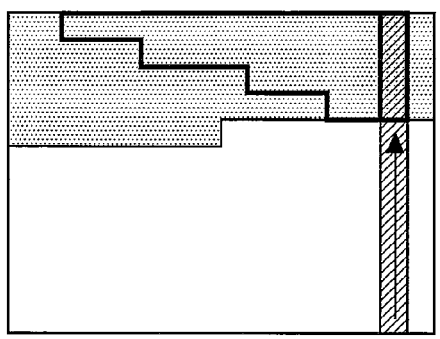
(W15) WRITING
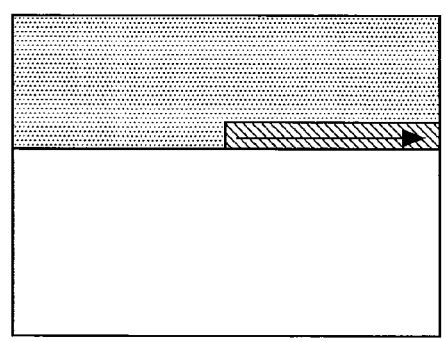
(R16) READING
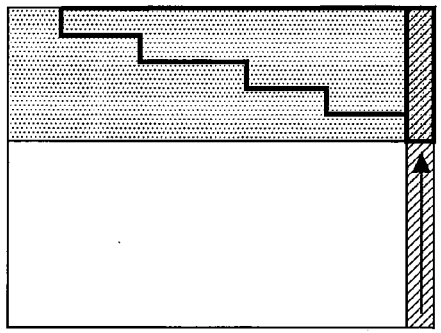
(W16) WRITING
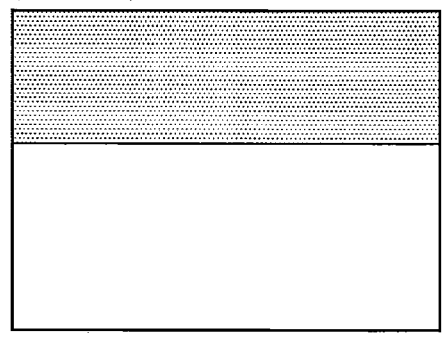

FIG. 7
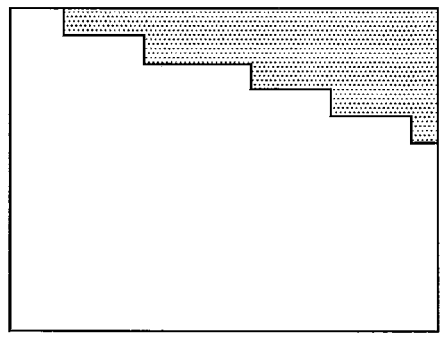
FIG. 8
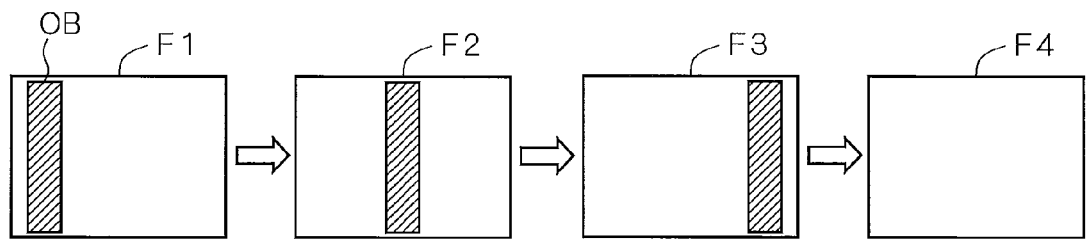
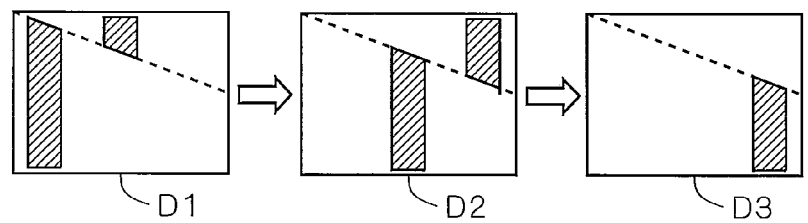
FIG. 9
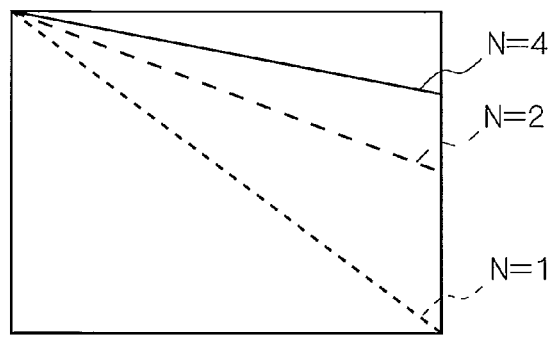

FIG. 14
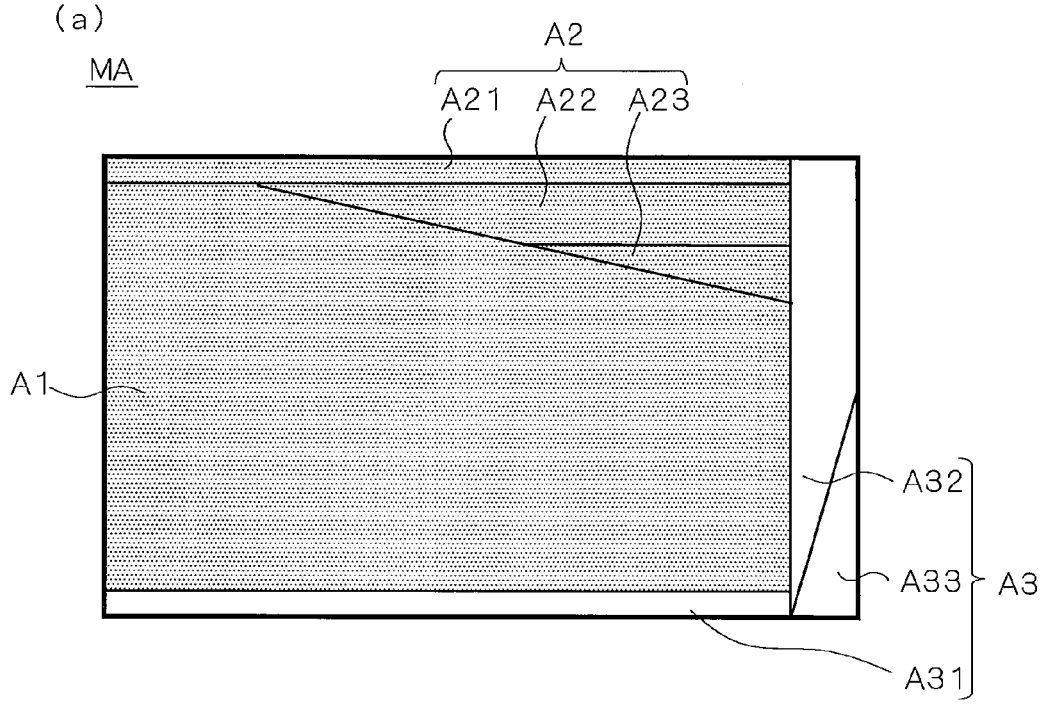
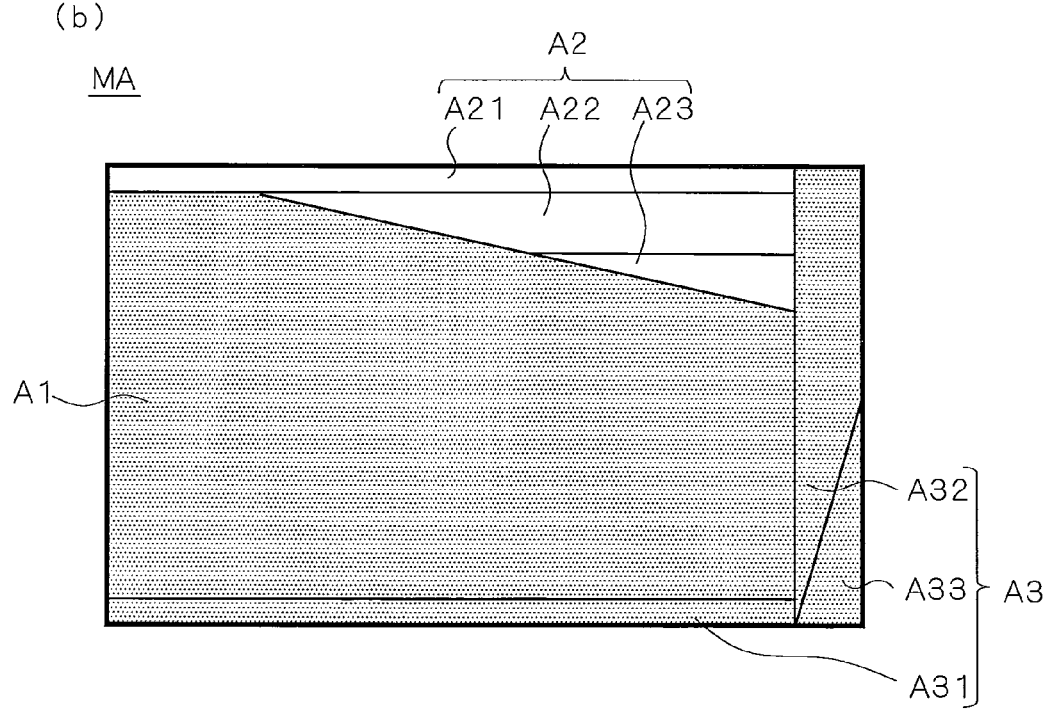

F I G . 1 5
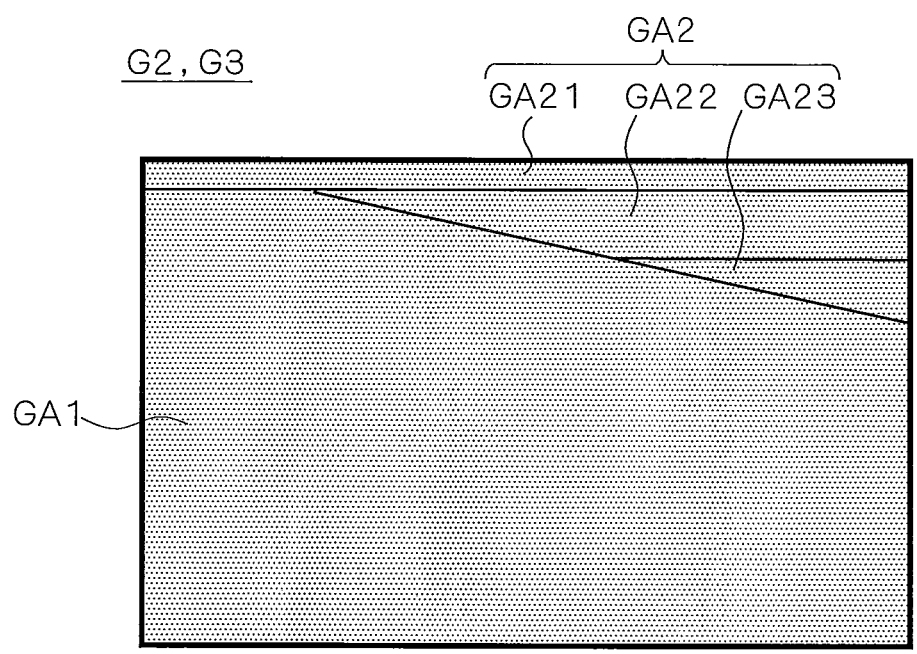

F I G. 1 7

(A)
SSWTriangleArea <= '1' when (16<=SSWPointer(16 downto 9)) and (SSWPointer(16 downto 9)<80)
and ((SSWPointer(16 downto 9))<('0' & SSWPointer(8 downto 2))) and DIPint(4) ='1' else '0';

(B)
SSWBlockArea <= '1' when SSWPointer(16 downto 13)="0000" and DIPint(4) ='1' else '0';

(C)
SSWHashPointer0 <= SSWPointer(8 downto 0) & "1111" & SSWPointer(12 downto 9);

(D)
SSWHashPointer1 <= "101" & not SSWPointer(14) & not SSWPointer(13) & not SSWPointer(12)
& not SSWPointer(11) & not SSWPointer(10) & not SSWPointer(9)
& not SSWPointer(7) & not SSWPointer(6) & not SSWPointer(5)
& not SSWPointer(4) & not SSWPointer(3) & not SSWPointer(2)
& not SSWPointer(1) & not SSWPointer(0);

(E)
SSWHashPointer2 <= "101" & SSWPointer(14 downto 9) & SSWPointer(7 downto 0);

F I G . 1 9

(A)

SSRTriangleArea <= '1' when (16<=SSRPointer(7 downto 0)) and (SSRPointer(7 downto 0)<80)
and((SSRPointer(7 downto 0))<('0' & SSRPointer(16 downto 10)))and DIPInt(4) ='1' else '0';

(B)

SSRBlockArea <= '1' when SSRPointer(7 downto 4)="0000" and DIPInt(4) ='1' else '0';

(C)

SSRHashPointer0 <= SSRPointer(16 downto 8) & "1111" & SSRPointer(3 downto 0);

(D)

SSRHashPointer1 <= "101" & not SSRPointer(5) & not SSRPointer(4) & not SSRPointer(3)
    & not SSRPointer(2) & not SSRPointer(1) & not SSRPointer(0)
    & not SSRPointer(15) & not SSRPointer(14) & not SSRPointer(13)
    & not SSRPointer(12) & not SSRPointer(11) & not SSRPointer(10)
    & not SSRPointer(9) & not SSRPointer(8);

(E)

SSRHashPointer2 <= "101" & SSRPointer(5 downto 0) & SSRPointer(15 downto 8);

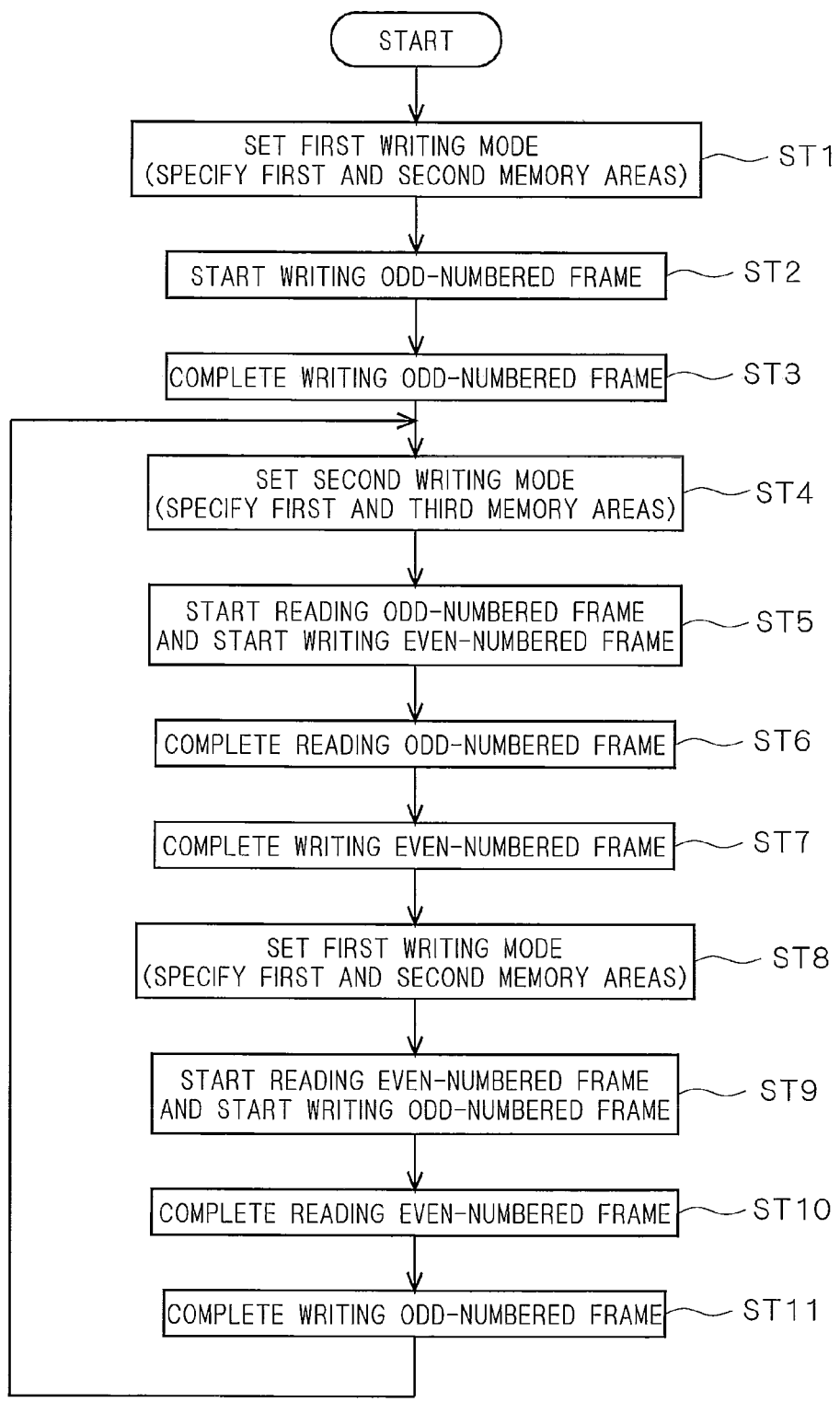

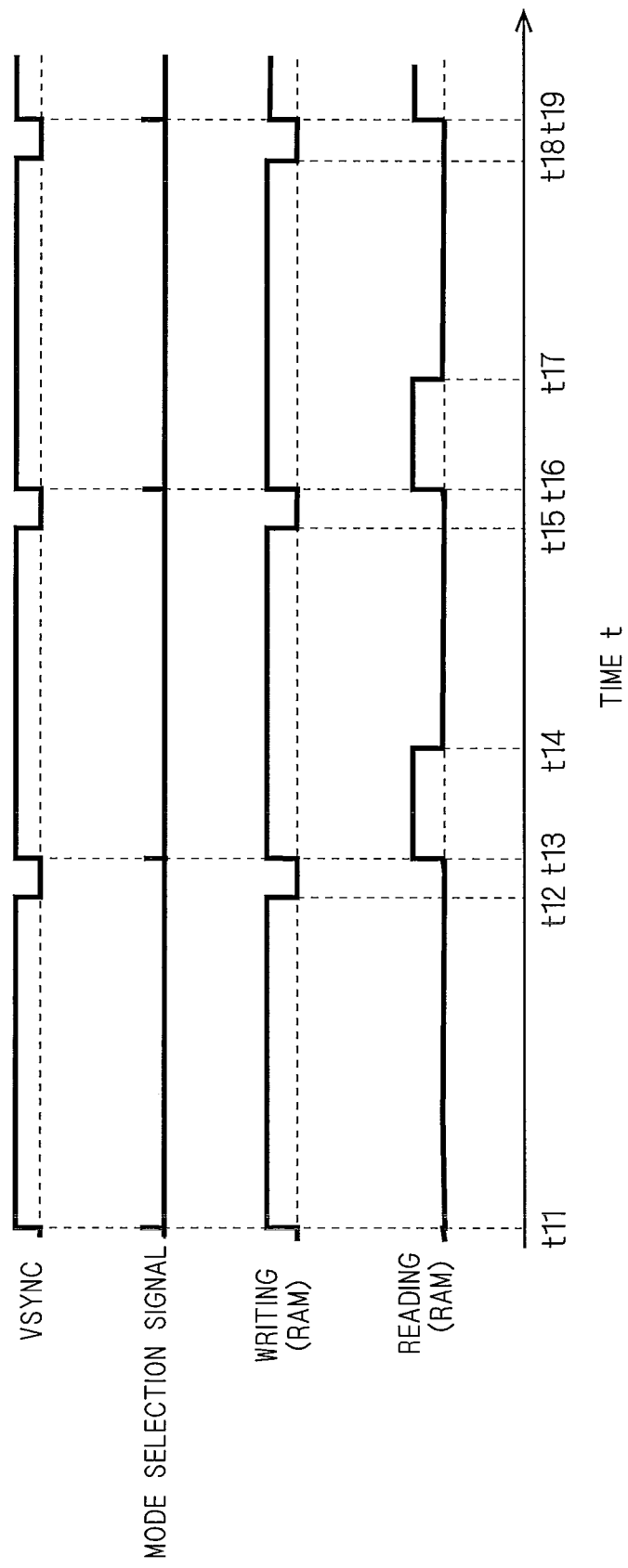

FIG. 22
(a)
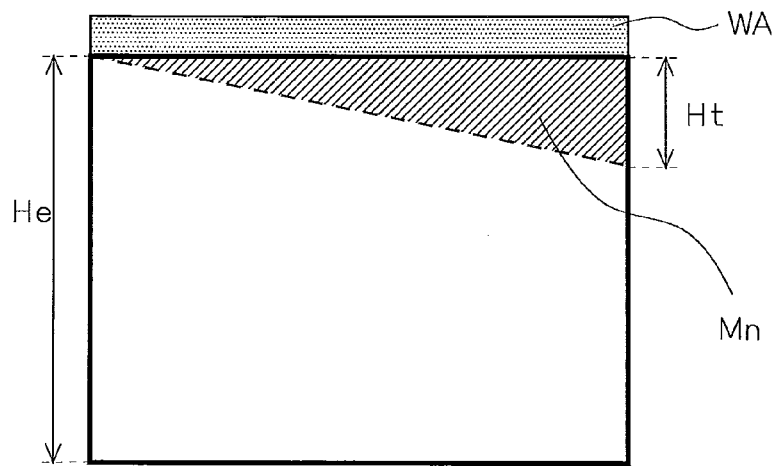
(b)
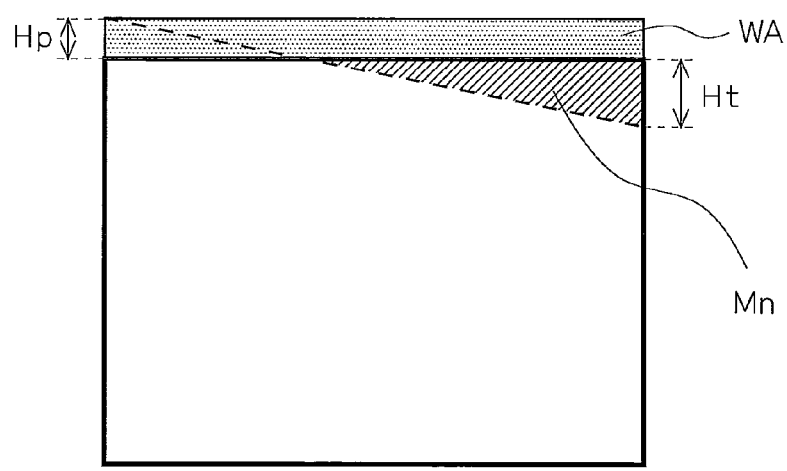
(c)
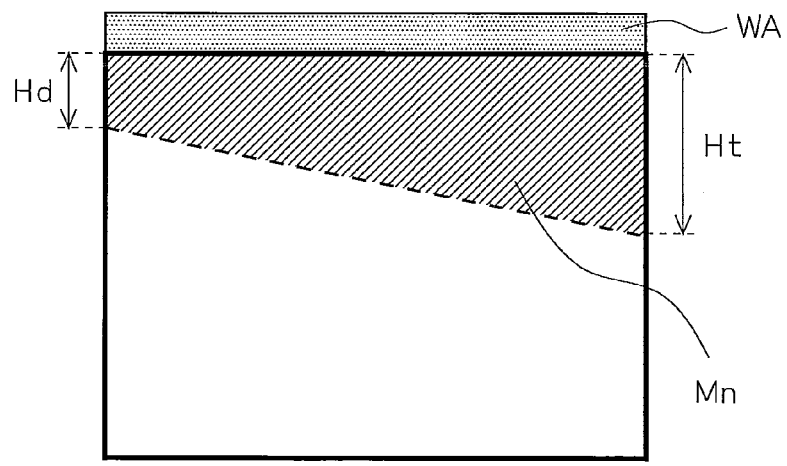

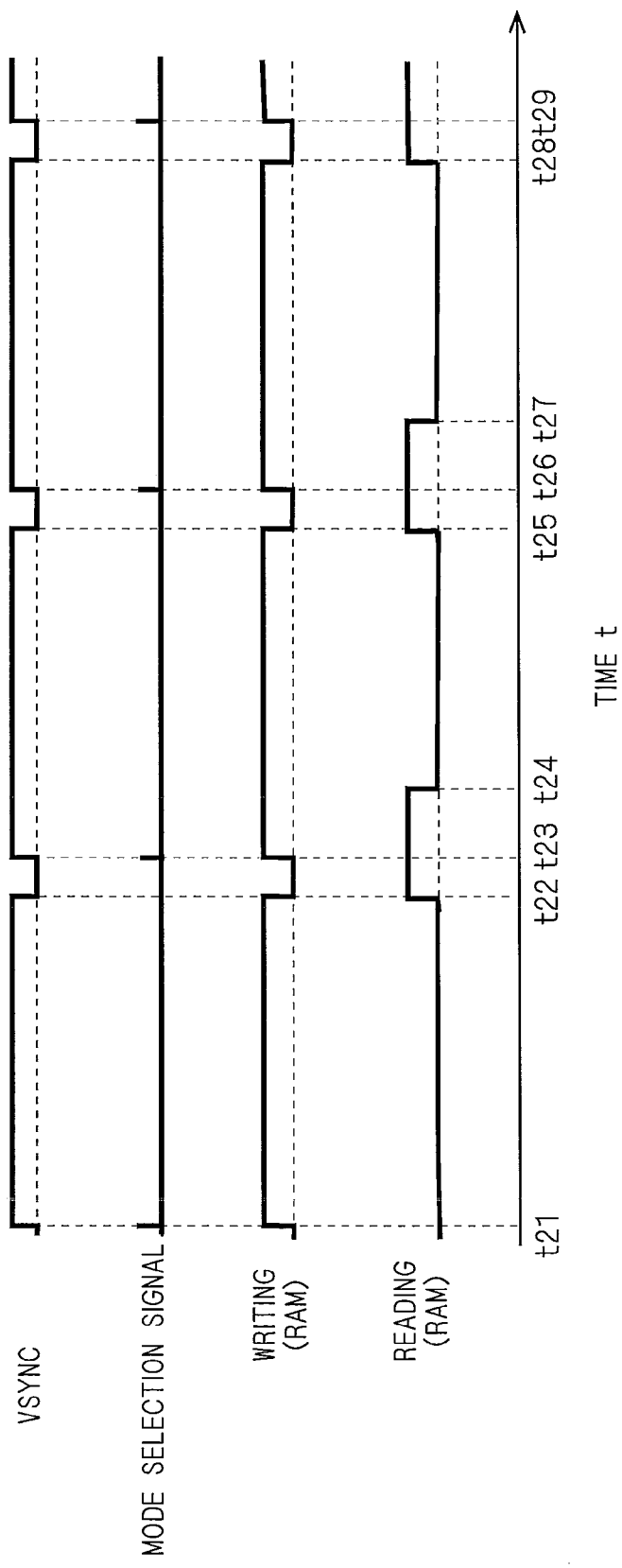

IMAGE DISPLAY DEVICE, ELECTRONIC DEVICE, DISPLAY CONTROLLER AND DISPLAY CONTROL METHOD

TECHNICAL FIELD

The present invention relates to a technique for displaying an image.

BACKGROUND ART

In recent years, various kinds of digital processing for images have been performed in various electronic devices such as a portable telephone, a personal digital assistant (PDA) and the like which have an image display device mounted thereon.

An image display device which is capable of displaying both a vertically oriented image and a horizontally oriented image can change display methods depending on displayed information to improve the visibility of the displayed information. This is an effective means especially for an image display device which is used by easily rotating an image display device body, such as a portable telephone, a PDA and the like.

Such an image display device necessitates image processing in which images are changed between the vertically oriented image and the horizontally oriented image. Various techniques for rotating images in image display devices have been proposed (see, for example, Japanese Patent Application Laid-Open No. 11-69135 (1999), Japanese Patent Application Laid-Open No. 10-307576 (1998), and the like). A variety of prior art techniques related to image display devices have also been proposed (see, for example, Japanese Patent Application Laid-Open No. 2004-56287, Japanese Patent Application Laid-Open No. 2003-114649, Japanese Patent Application Laid-Open No. 2002-82349, and the like).

However, if an attempt is made to rotate an image in the case of the display of a moving image using, for example, NTSC (National Television Standards Committee) video signals, a difference between a scanning direction during the writing of data into an image memory and a scanning direction during the reading of data from the image memory gives rise to a situation such that, in the course of the reading of image data from the image memory, the writing of image data for the next frame into the image memory is started. Thus, the image for the next frame is contained in each frame image constituting the display of the moving image. In other words, an oblique line indicating a boundary between two image areas different in subject conditions appears on a screen.

The appearance of such an oblique line becomes obvious especially when a subject changes significantly on a self light emitting display having a relatively high response speed, such as an organic EL display. In other words, the appearance of the oblique line is common to general displays having a relatively high response speed.

DISCLOSURE OF THE INVENTION

The present invention has been made to solve the above-mentioned problems. It is an object of the present invention to provide a technique capable of suppressing a phenomenon such that an oblique line appears on a display screen when the scanning line direction of a moving image is changed in an image memory.

To solve the above-mentioned problems, an image display device according to a first aspect comprises: a storage portion configured to store image data for a first frame constituting a moving image and for a second frame subsequent to the first frame, and having first to third memory areas; a writing portion configured to write the image data for said first frame into said first and second memory areas and to write the image data for said second frame into said first and third memory areas;

a reading portion configured to read the image data for said first frame from said first and second memory areas and to read the image data for said second frame from said first and third memory areas, said reading portion changing a scanning line direction for the image data for said first and second frames to be read to a second scanning line direction different from a first scanning line direction that is a scanning line direction for said image data prior to the writing into said storage portion; and a display portion configured to output the image data for said first and second frames read by said reading portion in time sequence in a visible manner.

This suppresses the phenomenon in which the oblique line appears on the display screen because of the change in the scanning line direction of the moving image in the storage.

An image display device according to a second aspect is configured such that, in the image display device according to the first aspect, said second and third memory areas are in non-overlapping relation to each other.

An image display device according to a third aspect is configured such that, in the image display device according to the first aspect, said first frame is an odd-numbered frame and said second frame is an even-numbered frame, and said writing portion writes the image data into said second and third memory areas alternately.

This suppresses the phenomenon in which the oblique line appears on the display screen when the scanning line direction of the moving image is changed in the image memory without involving an excessive increase in the storage capacity of the image memory.

An image display device according to a fourth aspect is configured such that, in the image display device according to the first aspect, said second memory area and said third memory area into which said image data are actually written are equal in storage capacity to each other.

An image display device according to a fifth aspect is configured such that, in the image display device according to the first aspect, said first to third memory areas are disposed within a single image memory.

This allows the use of an arrangement such that the frames constituting the moving image are written into and read from the single image memory, to thereby reduce manufacturing costs.

An image display device according to a sixth aspect is configured such that, in the image display device according to the first aspect, said reading portion starts to read the image data for said first frame written in said storage portion during a time period between the instant at which said writing portion completes the process of writing the image data for said first frame into said storage portion and the instant at which said writing portion starts the process of writing the image data for said second frame into said storage portion.

This allows the use of an arrangement such that the image data for one frame constituting a moving image starts being read from the image memory during a time period between the instant at which the process of writing the image data for the one frame into the image memory is completed and the instant at which the process of writing the image data for the next frame constituting the moving image into the image memory is started. This further reduces the capacity of the image memory required for the suppression of the phenomenon in which the oblique line appears on the display screen when the scanning line direction of the moving image is changed in the image memory.

An image display device according to a seventh aspect is configured such that, in the image display device according to the sixth aspect, the following relationships are satisfied:

$$N=(Vr/Vw) \quad \text{(I)}$$

$$0 \le B' \le B < (D/N) \quad \text{(II)}$$

$$E \le (1/2N) \times \{(D/N)-B'\}/(D/N) \quad \text{(III)}$$

where Vw is a rate at which said writing portion writes the image data for said first and second frames into said storage portion, Vr is a rate at which said reading portion reads the image data for said first and second frames from said storage portion, D is a time period over which the image data for said first and second frames read from said storage portion by said reading portion are written into said storage portion by said writing portion, B is a vertical retrace time during the writing of the image data for said first and second frames into said storage portion by said writing portion, B' is a time period by which the start of the reading of the image data for the first frame from said storage portion by said reading portion precedes the start of the writing of the image data for said second frame into said storage portion by said writing portion, E is the storage capacity of said third memory area, and the total storage capacity of said first and second memory areas is 1.

This minimizes the capacity of the image memory required for the suppression of the phenomenon in which the oblique line appears on the display screen when the scanning line direction of the moving image is changed in the image memory.

An image display device according to an eighth aspect is configured such that, in the image display device according to the first aspect, said first scanning line direction and said second scanning line direction are substantially orthogonal to each other.

An image display device according to a ninth aspect is configured such that, in the image display device according to the first aspect, said display portion has a light emitting device of a self light emitting type.

This effectively suppresses the oblique line appearing conspicuously on the screen because of the high response speed when the light emitting device of the self light emitting type is used.

An image display device according to a tenth aspect is configured such that, in the image display device according to the ninth aspect, said light emitting device has a response speed of not greater than 1000 μsec.

An electronic device according to an eleventh aspect comprises an image display device according to the first aspect.

An electronic device according to a twelfth aspect is configured such that, in the electronic device according to the eleventh aspect, said display portion includes a display having a rectangular shape with narrow side and a long side, and a data driver disposed along said narrow side of the display, said image data read from said memory areas being supplied to the data driver.

A display controller for controlling the display of a moving image according to a thirteenth aspect comprises: a storage portion configured to, store image data for a first frame constituting the moving image and for a second frame subsequent to the first frame, and having first to third memory areas; a writing portion configured to write the image data for said first frame into said first and second memory areas and to write the image data for said second frame into said first and third memory areas; and a reading portion configured to read the image data for said first frame from said first and second memory areas and to read the image data for said second frame from said first and third memory areas, said reading portion changing a scanning line direction for the image data for said first and second frames to a second scanning line direction different from a first scanning line direction that is a scanning line direction for said image data prior to the writing to said storage portion.

A method of controlling the display of a moving image according to a fourteenth aspect comprises: preparing a storage portion having first to third memory areas; writing image data for a first frame constituting the moving image into said first and second memory areas in a first direction; while reading the image data for said first frame from said first and second memory areas in a second direction different from said first direction, writing image data for a second frame subsequent to said first frame into said first and third memory areas of said storage portion in said first direction; and while reading the image data for said second frame from said first and third memory areas in said second direction, writing image data for a third frame subsequent to said second frame into said first and second memory areas in said first direction.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is an illustration of a mechanism for the appearance of an oblique line.

FIG. 4 is an illustration of the mechanism for the appearance of the oblique line.

FIG. 5 is an illustration of the mechanism for the appearance of the oblique line.

FIG. 6 is an illustration of the mechanism for the appearance of the oblique line.

FIG. 7 is an illustration of the mechanism for the appearance of the oblique line.

FIG. 8 is a conceptual illustration of an image in which an oblique line appears.

FIG. 9 is an illustration of a relationship between a reading rate and the location of the appearance of the oblique line.

FIG. 14 is an illustration of an example of the use of the memory areas related to odd-numbered and even-numbered pre-change frames.

FIG. 15 is an illustration of image areas constituting a pre-change frame image.

FIG. 17 is an illustration of detection formulas and conversion formulas for use in the writing of image data.

FIG. 19 is an illustration of detection formulas and conversion formulas for use in the reading of image data.

FIG. 20 is a flow chart related to the operation of changing the scanning line direction.

FIG. 21 is a timing chart related to the operation of changing the scanning line direction.

FIG. 22 is an illustration of a relationship between a reading start time and the position of the appearance of the oblique line.

FIG. 24 is a timing chart for the operation of changing the scanning line direction according to the second preferred embodiment.

BEST MODE FOR CARRYING OUT THE INVENTION

<Basic Technique>
<Change in Scanning Line Direction>

Figure 1:
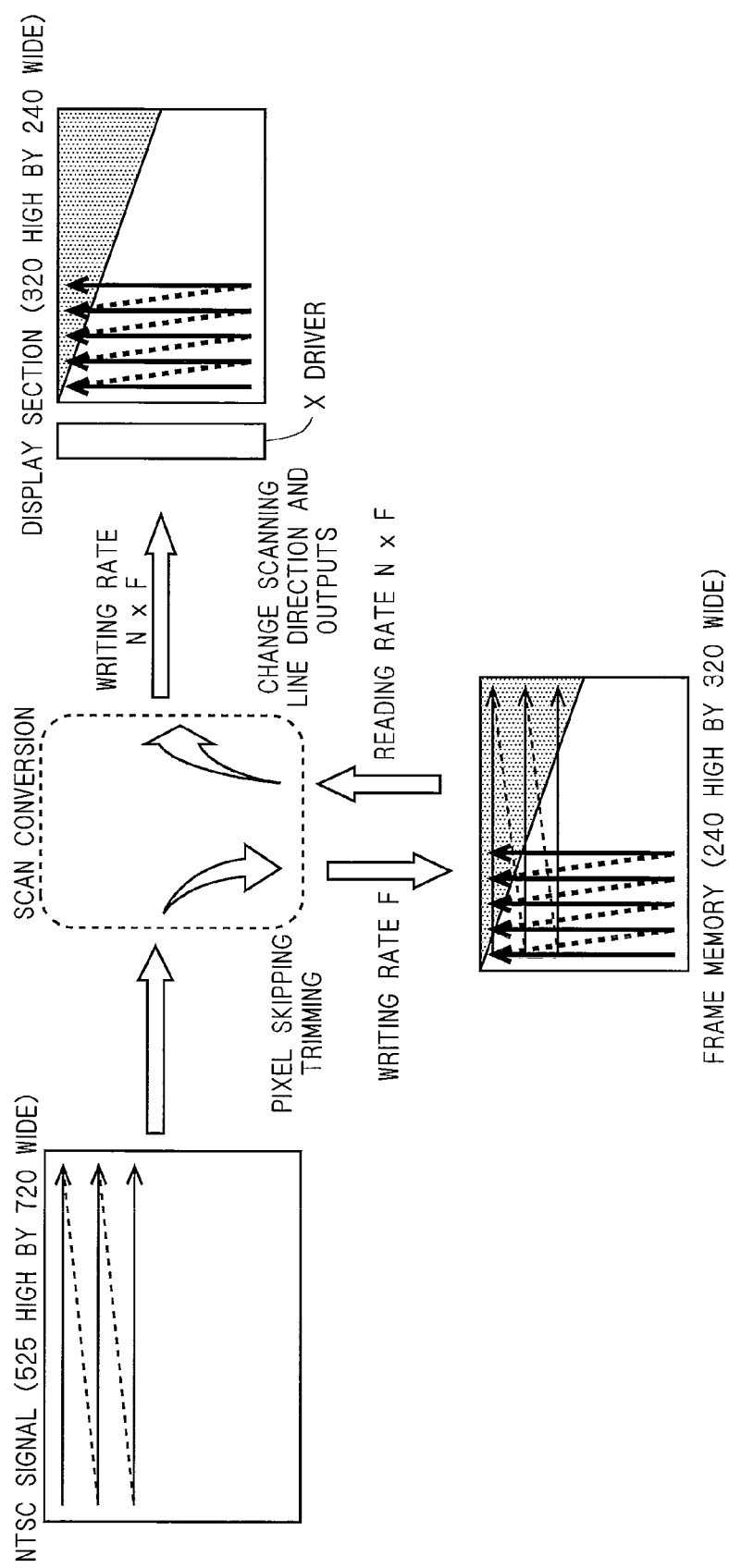
FIG. 1 is an illustration of a change in scanning line direction.

FIG. 1 is an illustration of a change in the direction of scanning lines (also referred to hereinafter as a "scanning line direction") for image data in reproducing a moving image.

An NTSC signal is an interlaced image signal having 525 scanning lines (the number of scanning lines) extending in a horizontal direction and producing 30 frames per second (or refreshing a screen 30 times per second). The NTSC signal has a horizontal scanning frequency of 15.75 kHz, and a vertical scanning frequency of 60 Hz. Each frame image based on the NTSC signal is 525 pixels high by 720 pixels wide, and is composed of two field images: a first field image forming odd-numbered scanning lines; and a second field image forming even-numbered scanning lines. Thus, each frame image based on the NTSC signal is displayed at a frequency of about 30 Hz, and each field image is displayed at a frequency of about 60 Hz.

In the frame image and the field image based on the NTSC signal, the direction in which the scanning lines extend (the scanning line direction) runs along the long side of the image. In a display section mounted on a compact electronic device such as a portable telephone, on the other hand, an X driver (a data driver) is often disposed along the narrow side of the display section in relation to circuit layout so that the scanning lines are disposed substantially in parallel with the direction of the narrow side of the display section. In displaying a moving image based on the NTSC signal on the display section, it is therefore necessary to rotate (or change) the scanning line direction of the frame images supplied to the display section approximately 90 degrees from the scanning line direction of each frame image based on the NTSC signal.

To change the scanning line direction in this manner, it is simply contemplated to make a scanning direction in writing image data into an image memory (a frame memory) and a scanning direction in reading image data from the frame memory substantially orthogonal to each other.

It is assumed, for example, that the display section is 320 pixels high by 240 pixels wide, and the frame memory has an address space corresponding to 240 by 320 pixels. In such a case, approximately one-half of the pixels are skipped vertically by the use of the first or second field image in a frame image (525 pixels high by 720 pixels wide) based on the NTSC signal, and one-half of the pixels are skipped horizontally in the image data (262 (or 263) pixels high by 720 pixels wide) subjected to the vertical pixel skipping (or the image data is used for every other pixel). Image data (referred to hereinafter as "display image data") on a 240 pixels high by 320 pixels wide image area, which corresponds to the image (262 (or 263) pixels high by 360 pixels wide) subjected to the vertical and horizontal pixel skipping excepting an outer peripheral portion, is written as the image data for one frame into the frame memory.

Specifically, a field image corresponding to one of the first and second field image among the frame images based on the NTSC signal fundamentally corresponds to a frame image (referred to hereinafter as a "display frame image") to be displayed on the display section. The first or second field image is optionally selectable as the display frame image. It is, however, preferable to select the first field image and the second field image alternately on a frame by frame basis from the viewpoint of displaying the moving image smoothly.

At this time, image data for lines each corresponding to 320 pixels are written into the address space corresponding to 240 by 320 pixels of the frame memory in time sequence at a writing rate (the number of pixels written per unit time in writing image data for one frame) F, with a horizontal direction in the figure serving as the scanning direction as indicated by thin arrows in the figure. After the writing of the image data (the image data for one frame) corresponding to 240 by 320 pixels into the frame memory is completed, on the other hand, the image data for one frame is read and outputted by the image data for each lines composed of 240 pixels in time sequence at a reading rate (the number of pixels read per unit time in reading image data for one frame for display) $G = N \times F$ (where N is a positive coefficient), with a vertical direction in the figure serving as the scanning direction as indicated by thick arrows in the figure. The image data is written into the X driver of the display section at a writing rate (the number of pixels written per unit time in writing the display image data for one frame) $N \times F$. An image is outputted to the display section in a visible manner at a frequency of 60 Hz, based on the image data written in the X driver.

However, the NTSC signal is transmitted substantially without interruption to achieve the reproduction of the moving image. Accordingly, the writing of the display image data into the frame memory is also done substantially without interruption. Thus, in the course of the reading of the display image data for one frame from the frame memory, the writing of the display image data for the next frame into the frame memory is started. In this manner, the display image data for the next frame (corresponding to an area shaded with dots in the figure) is contained in the display image data read from the frame memory. Thus, each image being displayed is composed of a plurality of (in this case, two) image areas in which subjects of different display frame images are captured, and a conspicuous oblique line (sloped line) appears on the boundary of the plurality of image areas.

A mechanism for the appearance of the oblique line will be described in further detail.

<Mechanism for Appearance of Oblique Line>

Figure 2:
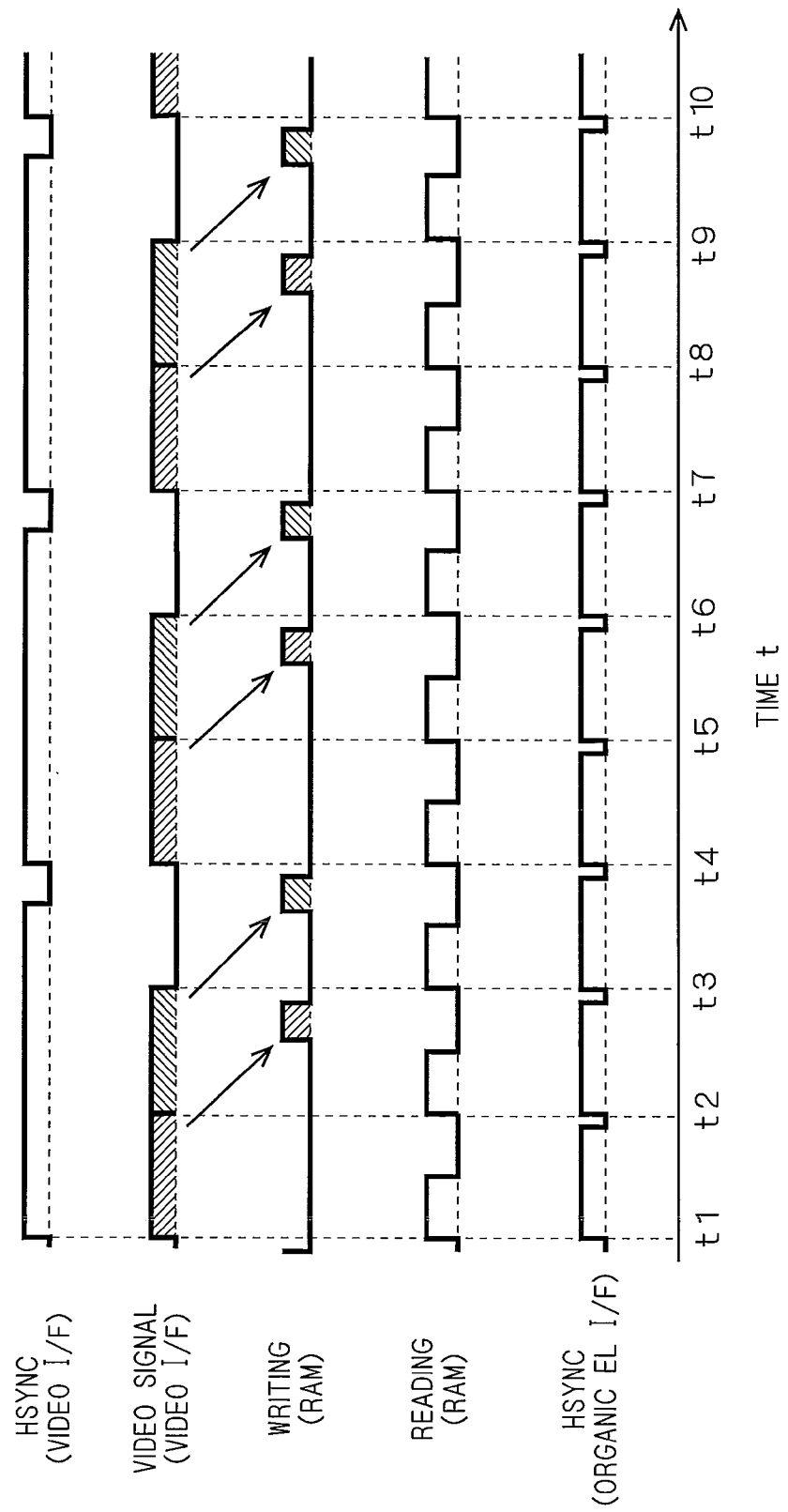
FIG. 2 is a timing chart related to the writing and reading of image data.

FIG. 2 is a timing chart illustrating the times of writing and reading of image data. In FIG. 2 is shown a timed relationship between the input of a horizontal synchronizing signal to a video I/F, the input of a video signal to the video I/F, the writing of image data into the frame memory (RAM), the reading of image data from the frame memory, and the input of the horizontal synchronizing signal to the display section in top-to-bottom order. In the instance illustrated in FIG. 2, the time interval between the inputs of the horizontal synchronizing signal to the display section is one-third of the time interval between the inputs of the horizontal synchronizing signal included in the NTSC signal.

As shown in FIG. 2, image data for 160 left-hand pixels in one line is inputted to the video I/F during the time interval between t1 and t2.

During the time interval between t2 and t3, image data for 160 right-hand pixels in one line is inputted to the video I/F, and the image data for the 160 left-hand pixels in one line is written into the frame memory.

During the time interval between t3 and t4, image data for one line along the narrow side is read from the frame memory, and thereafter the image data for the 160 right-hand pixels in one line is written into the frame memory.

During the time interval between t4 and t5, image data for 160 left-hand pixels in one line is inputted to the video I/F, and image data for one line along the narrow side is read from the frame memory.

During the time interval between t5 and t6, image data for 160 right-hand pixels in one line is inputted to the video I/F, and image data for one line along the narrow side is read from the frame memory, following which the image data for the 160 left-hand pixels in one line is written into the frame memory.

After time t6, an operation similar to that performed during the time interval between t3 to t6 is repeated to result in the change in the scanning line direction of the image data for each frame.

When, in the course of the reading of display image data from the frame memory, display image data for the next frame is written into the frame memory in accordance with such timing, an oblique line appears on the moving image.

FIGS. 3 to 6 are illustrations of the mechanism for the appearance of the oblique line on the moving image in accordance with the timing shown in FIG. 2. In FIGS. 3 to 6, a phenomenon occurring in the address space corresponding to 240 by 320 pixels of the frame memory is shown vicariously in an address space composed of 12 by 16 pixels in simplified form.

In FIGS. 3 to 6 is shown an instance in which the time at which display image data for one frame (image data for the current frame) already written in the frame memory starts being read from the frame memory and the time at which display image data for the next frame starts being written into the frame memory are substantially simultaneous.

In FIGS. 3 to 6, (R1) to (R16) denote memory areas (shaded areas) where display image data is read from the frame memory, and (W1) to (W16) denote memory areas (shaded areas) where display image data is written into the frame memory. The time relationship between the memory areas (R1) to (R16) and (W1) to (W16) is as follows: the chronological order in which these memory areas are arranged is (R1), (W1), (R2), (W2), (R3), (W3), ..., (R16), and (W16).

Further, in FIGS. 3 to 6, memory areas in which the display image data for the next frame is already written are shaded with dots, and memory areas from which the display image data for the next frame is read is surrounded with thick lines. The image data for the current frame is already written into the frame memory in the memory areas (R1) and (W1) of FIG. 3.

As shown in FIGS. 3 to 6, as the reading of the display image data for one frame proceeds, the writing of the display image data for the next frame proceeds. Thus, the display image data for the next frame is gradually incorporated into the display image data being read.

FIG. 7 is a conceptual illustration of the oblique line appearing in an image for one frame displayed on the display section by the reading and writing of the display image data as shown in FIGS. 3 to 6. An image area corresponding to the memory areas surrounded by the thick lines in FIGS. 3 to 6 is shaded with dots in FIG. 7.

As shown in FIG. 7, two image areas having different subject conditions define a substantially oblique boundary line (oblique line) extending obliquely from the upper left to the lower right in an upper portion of the image for one frame. Although the address space composed of 12 by 16 pixels in simplified form is shown in FIGS. 3 to 7, the oblique line is a substantially smooth, almost linear line in the address space composed of 240 by 320 pixels.

FIG. 8 is a conceptual illustration of an image in which the oblique line appears. Images (first to fourth pre-change frame images) F1 to F4 for frames (pre-change frames) successive in time prior to the change in scanning line direction are shown in an upper portion of FIG. 8, and images (first to third post-change frame images) D1 to D3 for frames successive in time after the change in scanning line direction are shown in a lower portion of FIG. 8. The first to fourth pre-change frame images F1 to F4 are frame images corresponding to the display image data generated by skipping one-half of the pixels horizontally in first to fourth frame images transmitted in time sequence by the NTSC signal and by cutting out an image area composed of 240 by 320 pixels in the center.

With reference to FIG. 8, a subject (shaded with hatch lines) OB is shown as moving from left to right in the first to fourth pre-change frame images F1 to F4 successive in time. When the scanning line direction for such first to fourth pre-change frame images F1 to F4 is changed to a substantially vertical direction in the frame memory as mentioned above, a region extending from near the center to the lower left in the first post-change frame image D1 displayed in the display section is formed by an image area corresponding to the first pre-change frame image F1. On the other hand, an upper right region in the first post-change frame image D1 is formed by an image area corresponding to the second pre-change frame image F2. In this manner, the boundary between the two image areas forms the oblique line (indicated by the dotted line in FIG. 8).

In the second post-change frame image D2, a region extending from near the center to the lower left is formed by an image area corresponding to the second pre-change frame image F2. On the other hand, an upper right region in the second post-change frame image D2 is formed by an image area corresponding to the third pre-change frame image F3. In this manner, the boundary between the two image areas forms the oblique line (indicated by the dotted line in FIG. 8).

In the third post-change frame image D3, a region extending from near the center to the lower left is formed by an image area corresponding to the third pre-change frame image F3. On the other hand, an upper right region in the third post-change frame image D3 is formed by an image area corresponding to the fourth pre-change frame image F4. In this manner, the boundary between the two image areas forms the oblique line (indicated by the dotted line in FIG. 8).

FIG. 9 is an illustration of a relationship between the reading rate and the location of the appearance of the oblique line on the moving image. In FIG. 9 is shown a typical instance in which the time (a reading start time) at which the image data for one frame starts being read from the frame memory and the time (a writing start time) at which the image data for the next frame starts being written into the frame memory are substantially simultaneous.

As shown in FIG. 9, when the writing rate F and the reading rate G(=N×F) are approximately equal to each other (where N=1), the oblique line appears in a position indicated by the dotted line of FIG. 9. The oblique line appears substantially in the center of the moving image. As the reading rate G is made higher relative to the writing rate F, the memory area where new image data is written into the frame memory decreases while the display image data for one frame is read from the frame memory. Thus, the position in which the oblique line appears on the moving image is shifted toward the upper right.

The instance in which the reading start time and the writing start time are substantially simultaneous is shown in FIG. 9. When, for example, the reading start time is slightly earlier than the writing start time, the position in which the oblique line appears on the moving image is translated slightly upwardly. When, for example, the reading start time is slightly later than the writing start time, on the other hand, the position in which the oblique line appears on the moving image is translated slightly downwardly.

As mentioned above, the oblique line appears on a display screen when the scanning line direction of the moving image is changed in the frame memory. In particular, when the writing and reading of the display image data for each frame into and from the frame memory are in synchronization with each other and are performed at the same frequency, the oblique line becomes obvious because the oblique line appears constantly in the same position. Further, it has been found that if the subject conditions change significantly between frames, the oblique line becomes more obvious to result in the significant deterioration in image quality.

To solve the problem, the present inventors have invented a technique capable of suppressing a phenomenon such that the oblique line appears on the display screen when the scanning line direction of the moving image is changed in the frame memory. This will be described below.

<First Preferred Embodiment>
<Overview of Image Display System>

Figure 10:
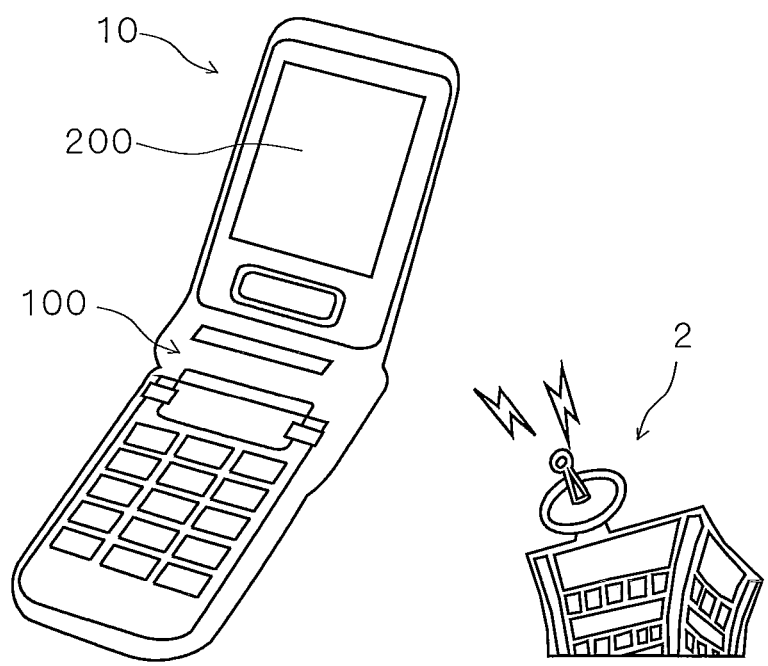
FIG. 10 is a schematic view showing an image display system according to a first preferred embodiment of the present invention.

FIG. 10 is a schematic view illustrating a general construction of an image display system 1 according to a first preferred embodiment of the present invention.

The image display system 1 is a system in which a portable telephone 10 receives an image signal for a moving image transmitted from a broadcast station 2 and the like to reproduce the moving image.

An example of the image signal for a moving image transmitted from the broadcast station 2 includes a signal based on the NTSC (National Television System Committee) system (an NTSC signal) and the like. An instance in which the portable telephone 10 receives the NTSC signal to reproduce an moving image will be given below for description.

The portable telephone 10 is a portable electronic device including a display controller 100 and a display section 200. The portable telephone 10 also functions as an image display device for displaying various images including a moving image in the display section 200.

The display controller 100 is a section for controlling the display section 200 displaying a moving image, based on the NTSC signal received by the portable telephone 10.

The display section 200 is a section including an organic EL display (organic electroluminescence display) having a rectangular shape, and a driver means to which display image data and control signals supplied from the display controller 100 are inputted.

The organic EL display is a display (a self light emitting type image display device) having a light emitting device of a self light emitting type which emits light from itself by the passage of electric current through an organic material. The organic EL display includes a plurality of pixels disposed in a matrix, data signal lines for supplying display image data to the pixels, and scanning signal lines for supplying a scanning signal for controlling the time to supply the display image data to the pixels through the data signal lines. The data signal lines and the scanning signal lines intersect at approximately right angles to each other.

The driver means includes an X driver (a data driver) electrically connected to the above-mentioned data signal lines and for controlling the time to supply the display image data to the above-mentioned data signal lines, and a Y driver (a line driver) electrically connected to the above-mentioned scanning signal lines and for controlling the time to supply the scanning signal to the scanning signal lines. The X driver is disposed along the narrow side of the organic EL display, and the Y driver is disposed along the long side of the organic EL display.

An instance in which the organic EL display constituting the display section 200 includes a 240 by 320 matrix of pixels will be given below for description. A time period over which the display image data for each frame constituting a moving image is written into a frame memory incorporated in the display controller 100 and a time period over which the display image data is read from the frame memory are completely separated. In other words, after the display image data for one frame is written into the frame memory, the display image data for the one frame is read from the frame memory. While the display image data for the one frame is read, the display image data for the next frame is written into the frame memory. An instance given herein is an organic EL display of a simultaneous light emission type in which the display image data are sequentially written into the display section 200 and the pixels of the display section 200 emit light simultaneously during the light emission based on the written display image data.

<Functional Construction of Display Controller>

Figure 11:
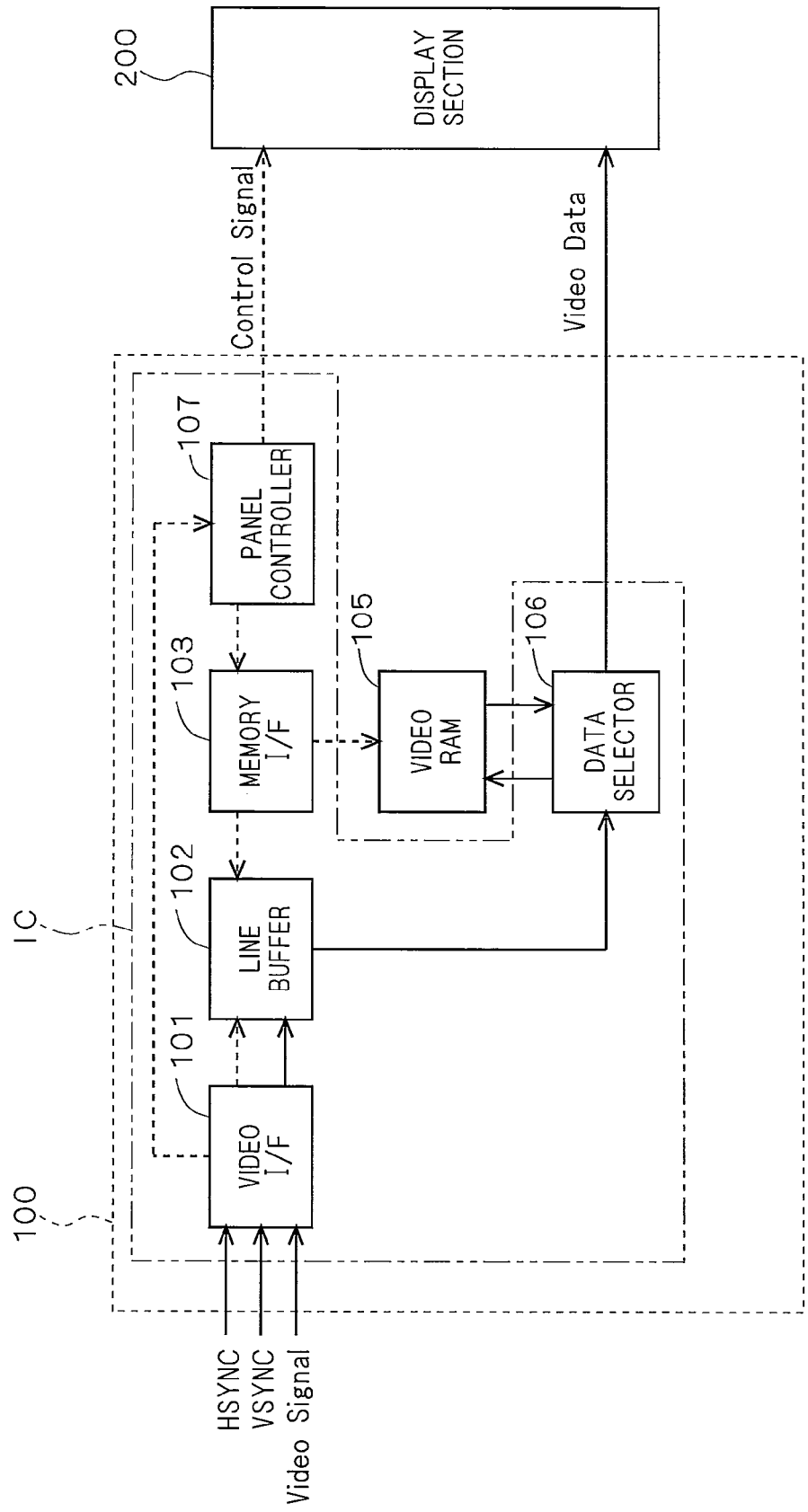
FIG. 11 is a block diagram illustrating a functional construction of a display controller.

FIG. 11 is a block diagram illustrating a functional construction of the display controller 100. Solid arrows in FIG. 11 indicate flows of image data, and dotted arrows indicate flows of various control signals.

The display controller 100 includes a video interface (video I/F) 101, a line buffer 102, a memory interface (memory I/F) 103, a video RAM 105, a data selector 106, and a panel controller 107 as hardware components.

The video I/F (Video Interface) 101 receives a digital video signal (Video Signal) obtained by a conversion based on an image signal (an NTSC signal) for a moving image, a vertical synchronizing signal (VSYNC) and a horizontal synchronizing signal (HSYNC) to reproduce XY addresses of pixels for each frame image constituting the moving image. A frame image corresponding to the NTSC signal includes a first field image forming odd-numbered scanning lines, and a second field image forming even-numbered scanning lines. These first and second field images are inputted alternately as the video signal to the video I/F 101.

The video I/F 101 includes an Y/C separator for converting image data into an RGB signal by Y/C separation.

Further, the video I/F 101 cuts image data on a partial image area (effective portion) tailored to the size of the display section 200 from the image data which is the RGB signal obtained by the conversion to send the cut image data to the line buffer 102. It is assumed below that the video I/F 101 horizontally skips one-half of the pixels (or uses pixel data for every other pixel) in the image data which is the RGB signal obtained by the conversion, and cuts image data on an image area corresponding to 240 by 320 pixels positioned substantially in the center as the display image data from the image data subjected to the pixel skipping.

It is also assumed that the video I/F 101 selects one of the image data corresponding to the inputted first and second field images to send the selected image data to the line buffer 102, thereby vertically skipping one-half of the pixels. Although any one of the first and second field images may be selected, it is preferable to select the first and second field images alternately for each frame from the viewpoint of smoothing the image. In this preferred embodiment, the first field image is selected for an odd-numbered frame, and the second field image is selected for an even-numbered frame.

The line buffer (Line Buffer) 102 temporarily stores the display image data (for example, image data for one line composed of pixel data on 320 pixels) sent from the video I/F 101. The line buffer 102 separately includes a portion for temporarily storing the display image data for the 160 left-hand pixels constituting one line, and a portion for temporarily storing the display image data for the 160 right-hand pixels constituting one line. The line buffer 102 transfers the display image data for 160 pixels (the display image data for the 160 left-hand pixels or the display image data for the 160 right-hand pixels) in time sequence to the video RAM 105 at the time indicated by the memory I/F 103.

The memory I/F (Memory Interface) 103 has a function as a writing portion and a reading portion according to the present invention. This memory I/F 103 controls the time to write (store) the display image data into the video RAM 105 and the time to read the display image data written in the video RAM 105 therefrom. At this time, the display image data for lines each corresponding to 1 by 320 pixels are written into the address space corresponding to 240 by 320 pixels of the video RAM 105 in time sequence at a writing rate (the number of pixels written per unit time in writing the image data for one frame) Vw, with a direction (a longitudinal direction) extending along the long side of one pre-change frame serving as the scanning line direction. When a signal for judging whether the display image data corresponds to image data for an odd-numbered frame or image data for an even-numbered frame is supplied from the panel controller 107 to the memory I/F 103, the memory I/F 103 performs an address conversion for designating a memory area to be written into the video RAM 105 in accordance with the supplied signal. Further, the memory I/F 103 selects the address of an memory area to be read from the video RAM 105 in accordance with a signal from the panel controller 107 to read display image data from the selected address. At this time, the display image data for lines each composed of 240 pixels are read from the address space corresponding to 240 by 320 pixels of the video RAM 105 in time sequence at a reading rate (the number of pixels read per unit time in reading the display image data for one frame) Vr, with a direction (a narrow side direction) extending along the narrow side of the display frame image serving as the scanning line direction. That is, under the control of the memory I/F 103, the display image data is read from the video RAM 105 while the scanning line direction is changed so that the scanning line direction for the display image data during the reading of the display image data for each frame is substantially orthogonal to the scanning line direction prior to the writing of the display image data. An instance in which the reading rate Vr is approximately three times higher than the writing rate Vw (N = Vr/Vw ≈3) will be given below for description. The display image data for respective frames read from the video RAM 105 are outputted in time sequence to the display section 200.

The video RAM 105 has a function as a storage according to the present invention. The video RAM 105 is an image memory for temporarily storing the display image data for each frame constituting a moving image outputted from the line buffer 102 and written thereinto. An instance in which the video RAM 105 has a memory area capable of storing pixel data on 256 by 352 pixels will be given below for description. In other words, the video RAM 105 has a storage capacity capable of storing image data for pixels (in this instance, 256 by 352 pixels) slightly greater in number than those (in this instance, 240 by 320 pixels) for one frame constituting a moving image. The appearance of the oblique line is suppressed by the memory I/F 103 converting the addresses at which the display image data are stored in the video RAM 105 between odd-numbered and even-numbered frames. The conversion of the addresses for storage will be described later.

The data selector (Data Selecter) 106 has a function as a switch for connecting a data bus in a corresponding direction when the display image data read from the line buffer 102 is written into the video RAM 105 and for connecting the data bus in a corresponding direction when the display image data read from the video RAM 105 is supplied to the display section 200.

The panel controller (Panel Controller) 107 produces control signals (Control Signal) for controlling the driving of the display section 200 to output the control signals. This panel controller 107 outputs the control signals to the memory I/F 103 and the driver means of the display section 200 to thereby achieve synchronization between the writing of the display image data into the video RAM 105, the reading of the display image data from the video RAM 105 and the visible output of an image based on the display image data on the organic EL display of the display section 200. Although not shown, the panel controller 107 generates and outputs various control signals in response to, for example, the vertical synchronizing signal contained in the NTSC signal.

In response to the receipt of the vertical synchronizing signal included in the NTSC signal, the panel controller 107 judges whether the image data selected by the video I/F 101 is the image data for the first or second field image, to thereby judge whether the display image data to be inputted to the video RAM 105 is the image data corresponding to an odd-numbered frame or the image data corresponding to an even-numbered frame. Also, the panel controller 107 outputs to the memory I/F 103 a signal indicating the conversion of the address during the writing of the image data in response to the result of the judgment. At this time, the panel controller 107 outputs to the memory I/F 103 a signal indicating the conversion of the address during the reading of the display image data written into the video RAM 105 to transmit information as to whether the display image data to be read from the video RAM 105 is the image data corresponding to an odd-numbered frame or the image data corresponding to an even-numbered frame, so that the data selector 106 reads the display image data from an appropriate memory area.

In this manner, the display image data for respective frames constituting a moving image are outputted in time sequence in a visible manner on the organic EL display of the display section 200, based on the display image data inputted from the data selector 106 to the display section 200 and the control signal inputted from the panel controller 107 to the display section 200, whereby the reproduction of the moving image is achieved.

The video I/F 101, the line buffer 102, the memory I/F 103, the data selector 106 and the panel controller 107 are implemented by a single IC in this preferred embodiment, but may be implemented by separate ICs.

<Method of Using Memory Areas During Reproduction of Moving Image>

Figure 12:
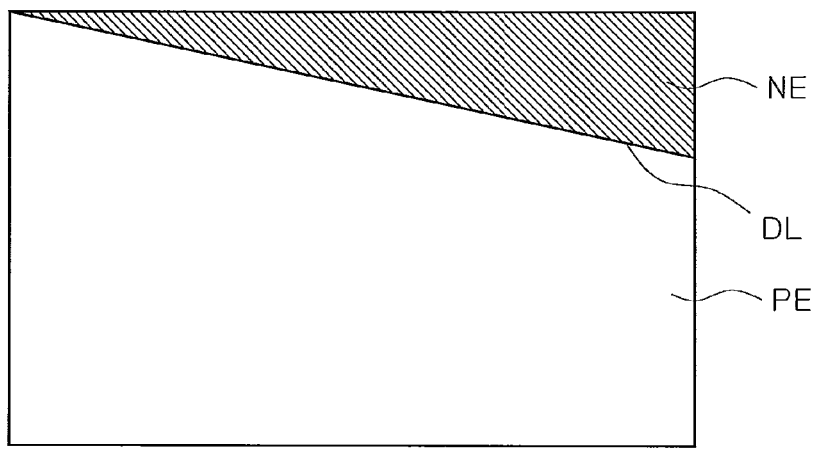
FIG. 12 is an illustration of a next frame containing area and the position of the appearance of the oblique line on an image.

FIG. 12 is an illustration of an area in which the next frame is contained and a position in which an oblique line appears in each frame image GI constituting a moving image when the scanning line direction is simply changed to a vertical direction in the image memory as in the above-mentioned basic technique. In FIG. 12, an area NE shaded with hatch lines in each frame image G1 indicates the image area (also referred to hereinafter as a "next frame containing area") in which the next frame is contained, and two image areas PE and NE are adjacent to each other, with an oblique line DL serving as aboundary.

As shown in FIG. 12, a conceivable simple way of preventing the appearance of the oblique line DL in the image G1 is to separately and individually prepare an image memory for temporarily storing the display image data for odd-numbered frames and an image memory for temporarily storing the display image data for even-numbered frames.

However, the increase in the number of frame memories (or memory areas) or in the storage capacity of the frame memories mounted in an electronic device leads to the increase in the manufacturing costs and in the size of the electronic device. In particular, the increase in the number of frame memories in the electronic device is required for the reproduction of a moving image, but is not especially required for other functions.

For this reason, the portable telephone 10 according to the first preferred embodiment suppresses the appearance of the oblique line by devising a method of using the memory areas of the video RAM 105 without possibly increasing the number of frame memories and the storage capacity of the memory areas.

Figure 13:
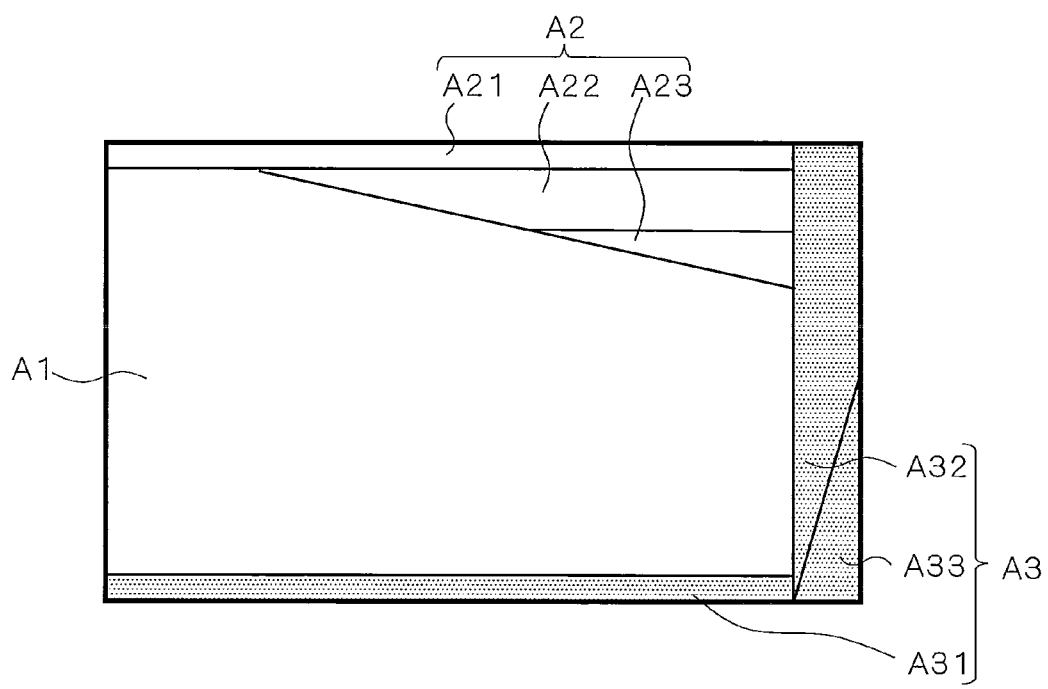
FIG. 13 is an illustration of a method of using memory areas related to a countermeasure against the oblique line.

FIG. 13 is an illustration of the method of using the memory areas of the video RAM 105 which is employed as a countermeasure against the oblique line appearing during the reproduction of the moving image in the portable telephone 10 according to the first preferred embodiment.

As shown in FIG. 13, a single address space MA in the video RAM 105 is divided into three memory areas (first to third memory areas) A1 to A3 which do not overlap each other, and used.

The addresses of the 256 by 352 pixels included in the video RAM 105 shall be arranged in a substantially rectangular area, as shown in FIG. 13. Then, with respect to the upper left corner in FIG. 13, a horizontal position and a vertical position in FIG. 13 shall be denoted by X (X=0 to 351) and Y (Y=0 to 255), respectively, and the address of each pixel shall be denoted by coordinates (X, Y).

A memory area formed by the first and second memory areas A1 and A2 corresponds to the upper left addresses of 240 by 320 pixels equivalent to a single frame among the addresses of the 256 by 352 pixels included in the video RAM 105. In the memory area formed by the first and second memory areas A1 and A2, the boundary between the first memory area A1 and the second memory area A2 substantially corresponds to the position in which the oblique line DL appears in each frame image G1 shown in FIG. 12. In other words, the second memory area A2 is provided so as to cover the next frame containing area NE in each frame image G1.

The third memory area A3 corresponds to the addresses of a substantially L-shaped area (shaded with dots in FIG. 13) other than the upper left addresses of 240 by 320 pixels equivalent to the single frame among the addresses of the 256 by 352 pixels included in the video RAM 105.

Specifically, for example, the first and second memory areas A1 and A2 are memory areas contained in a rectangle defined by connecting four addresses (0, 0), (0, 239), (319, 239) and (319, 0), and the third memory area A3 is a substantially L-shaped memory area defined by connecting six addresses (0, 240), (0, 255), (351, 255), (351, 0), (320, 0) and (320, 240).

More specifically, for example, the first memory area A1 is a pentagonal memory area defined by connecting five addresses (0, 16), (0, 239), (319, 239), (319, 80) and (64, 16).

The second memory area A2 is composed of a substantially rectangular memory area A21 defined by connecting four addresses (0, 0), (0, 15), (319, 15) and (319, 0), a substantially trapezoidal memory area A22 defined by connecting four addresses (65, 16), (192, 47), (319, 47) and (319, 16), and a substantially right-angled triangular memory area A23 defined by connecting three addresses (192, 48), (319, 79) and (319, 48).

The third memory area A3 is composed of a substantially rectangular memory area A31 defined by connecting four addresses (0, 240), (0, 255), (319, 255) and (319, 240), a substantially trapezoidal memory area A32 defined by connecting four addresses (320, 0), (320, 254), (351, 127) and (351, 0), and a substantially right-angled triangular memory area A33 defined by connecting three addresses (320, 255), (351, 255) and (351, 128).

FIG. 14 is an illustration of a technique for using the memory areas during the writing of the display image data corresponding to odd-numbered and even-numbered frames into the video RAM 105. FIG. 14(a) shows the memory areas (shaded with dots) into which the display image data for the odd-numbered frames are written in the single address space MA, and FIG. 14(b) shows the memory areas (shaded with dots) into which the display image data for the even-numbered frames are written in the single address space MA.

As shown in FIG. 14, the memory I/F 103 writes the display image data for the odd-numbered frames into the first and second memory areas A1 and A2, and writes the display image data for the even-numbered frames into the first and third memory areas A1 and A3.

Thus, the first memory area A1 is a memory area for common use during the storage of both the display image data for the odd-numbered frames and the display image data for the even-numbered frames. The second memory area A2, on the other hand, is used only during the storage of the display image data for the odd-numbered frames, and the third memory area A3 is used only during the storage of the display image data for the even-numbered frames. In other words, the second and third memory areas A2 and A3 different from each other are used exclusively and alternately. The memory area A2 and the memory area A3 are equal to each other in the storage capacity of the display image data to be actually written.

Thus, the memory I/F 103 writes image data on a predetermined image area (in this case, an area including the next frame containing area NE) for each frame constituting a moving image by addressing a memory area selected from among the second and third memory areas A2 and A3 exclusively and alternately as a memory area to be written. The scanning direction for the writing is a scanning line direction (a first scanning line direction) running along the long side of the frame image. Then, the display image data for odd-numbered frames constituting the moving image are read through the data selector 106 from the first and second memory areas A1 and A2. The display image data for even-numbered frames constituting the moving image, on the other hand, are read from the first and third memory areas A1 and A3. For the reading of the display image data written in the video RAM 105, the scanning direction for the reading is changed to a scanning line direction (a second scanning line direction) different from the first scanning line direction that is the scanning direction for the writing and running along the narrow side of the frame image.

The use of such a method of using the memory areas has the following advantages. While the display image data for an odd-numbered frame written in the first and second memory areas A1 and A2 is read from the video RAM 105, the second memory area A2 is prevented from being overwritten with the display image data for the next even-numbered frame. While the display image data for an even-numbered frame written in the first and third memory areas A1 and A3 is read from the video RAM 105, the third memory area A3 is prevented from being overwritten with the display image data for the next odd-numbered frame. While the display image data for an odd-numbered frame written in the first memory area A1 is read from the video RAM 105, the display image data for the next even-numbered frame is written into the first memory area A1. However, the display image data for the even-numbered frame is written sequentially into areas in which the reading of the display image data for the previous odd-numbered frame is already completed. On the other hand, while the display image data for an even-numbered frame written in the first memory area A1 is read from the video RAM 105, the display image data for the next odd-numbered frame is written into the first memory area A1. However, the display image data for odd-numbered frame is written sequentially into areas in which the reading of the display image data for the previous even-numbered frame is already completed.

Since the writing and reading of the display image data are performed as described above, a problem such that part of the display image data for the odd-numbered and even-numbered frames is not actually displayed in the display section 200 is well prevented. Thus, the appearance of the oblique line is suppressed.

A mode in which the first and second memory areas A1 and A2 are specified as areas (a write destination) to be written is referred to hereinafter as a "first writing mode," and a mode in which the first and third memory areas A1 and A3 are specified as areas (a write destination) to be written is referred to hereinafter as a "second writing mode."

<Address Conversion in Writing and Reading>

FIG. 15 is an illustration of first and second image areas GA1 and GA2 constituting a frame image G2 prior to the writing into the image memory, and a plurality of image areas GA21, GA22 and GA23 constituting the second image area GA2.

In FIG. 15, the first image area GA1 is an image area corresponding to the addresses of the first memory area A1, and the second image area GA2 is an image area corresponding to the addresses of the second memory area A2. The image area GA21 is an image area corresponding to the addresses of the memory area A21. The image area GA22 is an image area corresponding to the addresses of the memory area A22. The image area GA23 is an image area corresponding to the addresses of the memory area A23.

When the first writing mode is set, the display image data on the frame image G2 is not subjected to the address conversion, but is directly written into the first and second memory areas A1 and A2.

When the second writing mode is set, on the other hand, the display image data on the second image area GA2 included in the display image data on the frame image G2 is subjected to the address conversion and is then written into the third memory area A3. Specifically, the display image data on the image area GA21 included in the display image data on the frame image G2 is subjected to the address conversion and is then written into the memory area A31. The display image data on the image area GA22 is subjected to the address conversion and is then written into the memory area A32. The display image data on the image area GA23 is subjected to the address conversion and is then written into the memory area A33.

Further, when the display image data written in the third memory area A3 is read therefrom, a conversion for changing back to the same addresses (original addresses) as the frame image G2 is performed to reproduce the image data. At this time, a display frame image G3 identical with the frame image G2 shown in FIG. 15 is reproduced.

The address conversion in the second writing mode will be further described with reference to FIGS. 16 and 17. The first writing mode, in which no address conversion is performed, will not be described.

Figure 16:
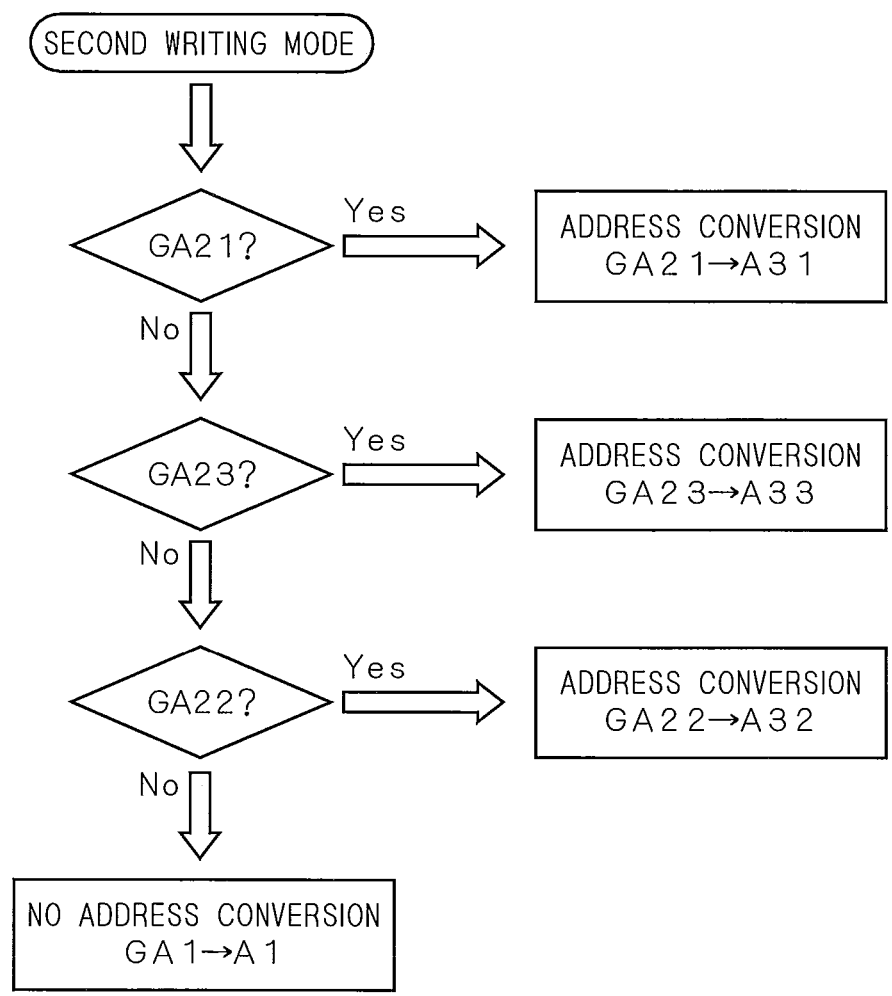
FIG. 16 is a diagram illustrating a flow chart for processing in a second writing mode.

(1) First, as shown in FIG. 16, the memory I/F 103 judges whether the address of each bit of the display image data belongs to the image area GA21 or not in the second writing mode. As a result, when such a bit is judged to belong to the image area GA21, the address is converted, and the bit is written into the memory area A31. This process is expressed as:

$$\text{IF } 0 \leq X \leq 319 \text{ AND } 0 \leq Y \leq 15, \text{ THEN } X'=X \text{ AND } Y'=Y+240 \quad \ldots \text{(i)}$$

where X and Y are addresses prior to the address conversion, and X' and Y' are addresses after the address conversion.

(2) Next, the memory I/F 103 judges whether the bit that is not judged to belong to the image area GA21 belongs to the image area GA23 or not. As a result, when the bit is judged to belong to the image area GA23, the address is converted, and the bit is written into the memory area A33.

$$\text{IF } (192 \leq X \leq 319 \text{ AND } 48 \leq Y \leq 79 \text{ AND } Y<X/4), \text{ THEN } X'=399-Y \text{ AND } Y'=X-64 \quad \text{(ii)}$$

(3) Subsequently, the memory I/F 103 judges whether the bit that is not judged to belong to the image areas GA21 and GA23 belongs to the image area GA22 or not. As a result, when the bit is judged to belong to the image area GA22, the address is converted, and the bit is written into the memory area A32.

$$\text{IF } (192 \leq X \leq 319 \text{ AND } 16 \leq Y \leq 47) \text{ OR } (64 \leq X \leq 192 \text{ AND } 16 \leq Y \leq 47 \text{ AND } Y<X/4), \text{ THEN } X'=Y+304 \text{ AND } Y'=319-X \quad \text{(iii)}$$

(4) Finally, the address of the bit that is not judged to belong to the image areas GA21, GA22 and GA23 belongs to the image area GA1 regarding the address of each bit of the display image data. Thus, the address of such a bit is not converted, but is directly written into the first memory area A1.

After the above-mentioned processes, the display image data is written into the desired first and third memory areas A1 and A3 in the second writing mode.

An example of a program created in the VHDL programming language by the present inventor and for performing the above-mentioned address conversion is shown in FIG. 17. It is assumed herein that each of the X and Y addresses is expressed using 8 bits, and that the first to eighth bits indicate the X address and the ninth to sixteenth bits indicate the Y address. SSWPointer(z) denotes an address prior to the conversion, and z ($0 \leq z \leq 15$) denotes a bit number (the z-th bit). DIPint(4) denotes a state of a switch for determining whether to perform the address conversion or not. When the state is "1," the address conversion is performed. When the state is "0," the address conversion is not performed.

FIG. 17(A) shows a formula for detecting the boundary between the image areas GA22, GA23 and the first image area GA1 from the display image data on the frame image G2.

This detection formula enables the memory I/F 103 to detect a triangular image area composed of the image areas GA22 and GA23 from the display image data on the frame image G2. In the detection formula, SSWTriangleArea is a parameter indicating whether the image data belongs to the area composed of the image areas GA22 and G23 or not. The parameter that is "1" indicates that the image data belongs to the image areas GA22 and G23.

FIG. 17(B) shows a formula for detecting the boundary between the image area GA21 and the other image areas from the display image data on the frame image G2. This detection formula enables the memory I/F 103 to detect the rectangular image area GA21 positioned on the upper side from the display image data on the frame image G2. In the detection formula, SSWBlockArea is a parameter indicating whether the image data belongs to the area of the image area GA21 or not. The parameter that is "1" indicates that the image data belongs to the image area GA21.

FIG. 17(C) shows a formula for converting the addresses of the rectangular image area GA21 positioned on the upper side which is detected using the detection formula shown in FIG. 17(B) into the addresses of the memory area A31 positioned on the lower side of the address space MA of the video RAM 105. In the formula, SSWHashPointer0 indicates a formula for mapping the image area GA21 to the image area corresponding to the addresses of the memory area A31.

FIG. 17(D) shows a formula for converting the addresses of the image area GA23 which is detected using the detection formula shown in FIG. 17(A) into the addresses of the memory area A33 positioned on the right-hand side of the address space MA of the video RAM 105. In the formula, SSWHashPointer1 indicates a formula for mapping the image area GA23 to the image area corresponding to the addresses of the memory area A33.

FIG. 17(E) shows a formula for converting the addresses of the image area GA22 which is detected using the detection formula shown in FIG. 17(A) into the addresses of the memory area A32 positioned on the right-hand side of the address space MA of the video RAM 105. In the fomula, SSWHashPointer2 indicates a formula for mapping the image area GA22 to the image area corresponding to the addresses of the memory area A32.

Next, a second reading mode in which the display image data written in the second writing mode is read will be described with reference to FIGS. 18 and 19. A first reading mode corresponding to the first writing mode is not described because the address conversion is not performed in the first reading mode.

Figure 18:
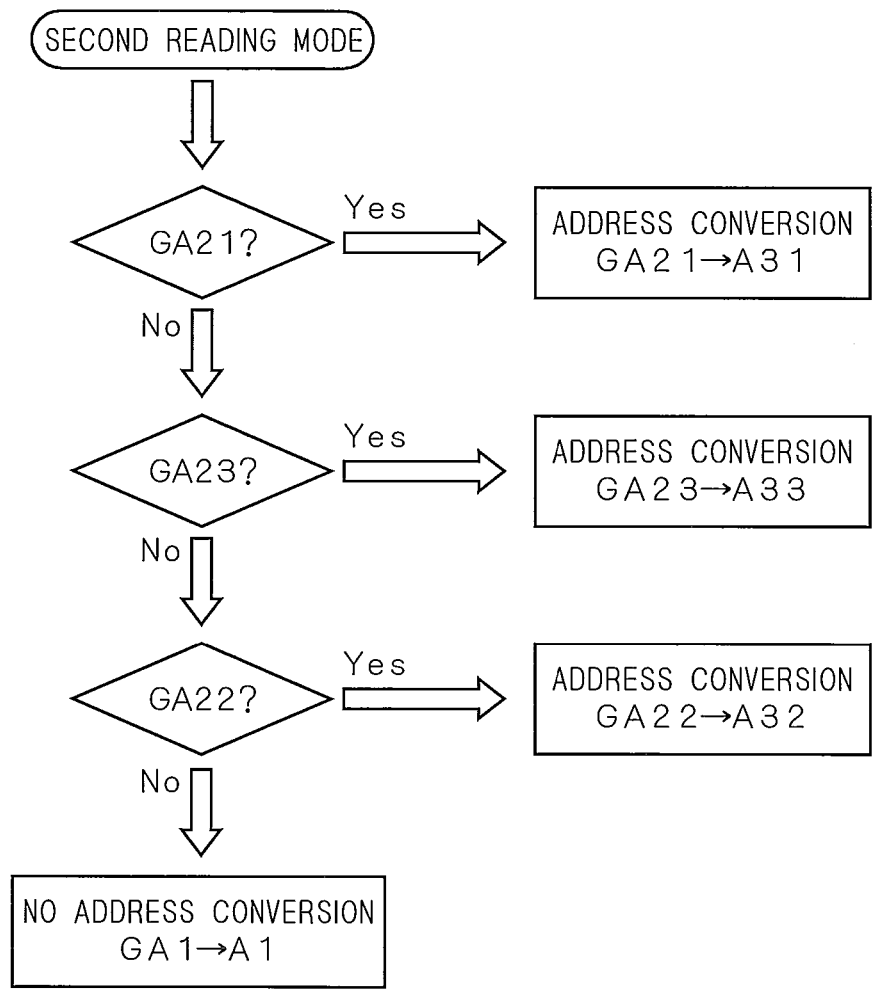
FIG. 18 is a diagram illustrating a flow chart for reading processing corresponding to the second writing mode.

(1) First, as shown in FIG. 18, the memory I/F 103 judges whether each bit of the display image data written in the second writing mode belongs to the image area GA21 or not. When such a bit is judged to belong to the image area GA21, the address is converted based on the above-mentioned expression (i), and the bit is read from the memory area A31.

(2) The memory I/F 103 judges whether the bit that is not judged to belong to the image area GA21 belongs to the image area GA23 or not. As a result, when the bit is judged to belong to the image area GA23, the address is converted based on the above-mentioned expression (ii), and the bit is read from the memory area A33.

(3) The memory I/F 103 judges whether the bit that is not judged to belong to the image areas GA21 and GA23 belongs to the image area GA22 or not. As a result, when the bit is judged to belong to the image area GA22, the address is converted, and the bit is read from the memory area A32.

(4) The bit that is not judged to belong to the image areas GA21, GA22 and GA23 belongs to the image area GA1 regarding the address of each bit of the display image data.

Thus, the address of such a bit is not converted, but is directly read from the first memory area A1.

After the above-mentioned processes, the display image data is read from the desired first and third memory areas A1 and A3 in the second reading mode.

FIG. 19 is an illustration of memory area detection formulas and address conversion formulas for use in reading the display image data written in the video RAM 105 in the second writing mode, and shows an example of a program created in the VHDL programming language by the present inventor and for performing the above-mentioned address conversion. It is assumed herein that each of the X and Y addresses is expressed using 8 bits, and that the first to eighth bits indicate the X address and the ninth to sixteenth bits indicate the Y address. SSRPointer(z) denotes an address prior to the conversion, and z ($1 \leq z \leq 16$) denotes a bit number (the z-th bit). DIPint(4) denotes a state of a switch for determining whether to perform the address conversion or not. When the state is "1," the address conversion is performed. When the state is "0," the address conversion is not performed.

FIG. 19(A) shows a formula for detecting the boundary between the image areas GA22, GA23 and the first image area GA1 for the display image data on the single display frame image G3. This detection formula enables the data selector 106 to detect a triangular image area composed of the image areas GA22 and GA23 in the display image data on the display frame image G3. In the detection formula, SSRTriangleArea is a parameter indicating whether the image data belongs to the image area composed of the image areas GA22 and G23 or not. The parameter that is "1" indicates that the image data belongs to the image areas GA22 and G23.

FIG. 19(B) shows a formula for detecting the boundary between the image area GA21 and the other image areas for the display image data on the display frame image G3. This detection formula enables the data selector 106 to detect the rectangular image area GA21 positioned on the upper side from the display image data on the display frame image G3. In the detection formula, SSRBlockArea is a parameter indicating whether the image data belongs to the area of the image area GA21 or not. The parameter that is "1" indicates that the image data belongs to the image area GA21.

FIG. 19(C) shows a formula for converting the addresses of the memory area for reading therefrom the display image data constituting the rectangular image area GA21 positioned on the upper side which is detected using the detection formula shown in FIG. 19(B) into the addresses of the memory area A31 positioned on the lower side of the address space MA of the video RAM 105. In the formula, SSRHashPointer0 indicates a formula for mapping the image area GA21 to the image area GA31.

FIG. 19(D) shows a formula for converting the addresses of the memory area for reading therefrom the display image data constituting the image area GA23 which is detected using the detection formula shown in FIG. 19(A) into the addresses of the memory area A33 positioned on the right-hand side of the address space MA of the video RAM 105. In the formula, SSRHashPointer1 indicates a formula for mapping the image area GA23 to the image area GA33.

FIG. 19(E) shows a formula for converting the addresses of the memory area for reading therefrom the display image data constituting the image area GA22 which is detected using the detection formula shown in FIG. 19(A) into the addresses of the memory area A32 positioned on the right-hand side of the address space MA of the video RAM 105. In the formula, SSRHashPointer2 indicates a formula for mapping the image area GA22 to the image area GA32.

<Operation of Changing Scanning Line Direction>

FIG. 20 is a flow chart related to the operation of changing the scanning line direction in the display controller 100. FIG. 21 is a timing chart related to the operation of changing the scanning line direction in the display controller 100. A timed relationship between the vertical synchronizing signal, a signal (a mode selection signal) for mode selection between the first and second writing modes, the writing of image data into the video RAM 105, and the reading of image data from the video RAM 105 in top-to-bottom order is shown in the timing chart of FIG. 21.

The procedure of operation shown in FIG. 20 will be described with reference to the timing chart of FIG. 21. The procedure of operation shown in FIG. 20 is started in response to the input of the NTSC signal to the video I/F 101, and proceeds to Step ST1 of FIG. 20.

In Step ST1, the memory I/F 103 specifies the first and second memory areas A1 and A2 of the video RAM 105 as memory areas into which the display image data for odd-numbered frames are to be written (at time t11 of FIG. 21). In other words, the first writing mode is set.

In Step ST2, the memory I/F 103 starts writing the display image data for an odd-numbered frame into the first and second memory areas A1 and A2 (at time t11 of FIG. 21).

In Step ST3, the writing of the display image data for the odd-numbered frame is completed (at time t12 of FIG. 21).

In Step ST4, the memory I/F 103 specifies the first and third memory areas A1 and A3 of the video RAM 105 as memory areas into which the display image data for even-numbered frames are to be written. In other words, the second writing mode is set (at time t13 of FIG. 21).

In Step ST5, the memory I/F 103 starts the process of reading the display image data for an odd-numbered frame stored in the first and second memory areas A1 and A2 of the video RAM 105, and starts the process of writing the display image data for an even-numbered frame into the first and third memory areas A1 and A3 (at time t13 of FIG. 21).

In Step ST6, the reading of the display image data for the odd-numbered frame is completed (at time t14 of FIG. 21).

In Step ST7, the writing of the display image data for the even-numbered frame is completed (at time t15 of FIG. 21). The reading of the display image data for the odd-numbered frame is completed before the writing of the display image data for the even-numbered frame is completed because the reading rate Vr is higher than the writing rate Vw.

In Step ST8, the first writing mode is set (at time t16 of FIG. 21).

In Step ST9, the memory I/F 103 starts the process of reading the display image data for an even-numbered frame stored in the first and third memory areas A1 and A3 of the video RAM 105, and starts the process of writing the display image data for an odd-numbered frame into the first and second memory areas A1 and A2 (at time t16 of FIG. 21).

In Step ST10, the reading of the display image data for the even-numbered frame is completed (at time t17 of FIG. 21).

In Step ST11, the writing of the display image data for the odd-numbered frame is completed (at time t18 of FIG. 21). Thereafter, the procedure proceeds to Step ST4, and the processes in Steps ST4 to ST11 are repeated.

In the course of the repeated processes in Steps ST4 to ST11, the process in Steps ST5 and ST6 changes the scanning line direction related to the display image data for each odd-numbered frame constituting a moving image from the first scanning line direction to the second scanning line direction different from the first scanning line direction to output the display image data for each odd-numbered frame constituting the moving image while the display image data for each odd-numbered frame constituting the moving image is read from the first and second memory areas A1 and A2. The display image data for each even-numbered frame constituting the moving image, on the other hand, is written into the third memory area A3 different from the second memory area A2 and into the first memory area A1.

The process in Steps ST9 and ST10 changes the scanning line direction related to the display image data for each even-numbered frame constituting the moving image from the first scanning line direction to the second scanning line direction to output the display image data for each even-numbered frame constituting the moving image while the display image data for each even-numbered frame constituting the moving image is read from the first and third memory areas A1 and A3. The display image data for each odd-numbered frame constituting the moving image, on the other hand, is written into the first and second memory areas A1 and A2.

Although not shown in FIG. 20, the completion of the input of the NTSC signal to the video I/F 101 completes the procedure of operation of FIG. 20.

As described above, when writing and reading the display image data for the respective frames constituting a moving image into and from the video RAM 105, the image display system 1 according to the first preferred embodiment of the present invention writes the display image data for odd-numbered frames into the first and second memory areas A1 and A2, and writes the display image data for even-numbered frames into the first and third memory areas A1 and A3. In other words, one of the second and third memory areas A2 and A3 is specified exclusively and alternately as the writing destination, and the display image data for the frames constituting the moving image are written into the video RAM 105. Then, when the display image data for the frames are read, the scanning line direction of the display image data for the frames is changed from the first scanning line direction (in this case, a scanning line direction running along the long side of the frame image) to the second scanning line direction (in this case, a scanning line direction running along the narrow side of the frame image) different from the first scanning line direction, and the display image data for the frames are outputted.

More specifically, when the display image data for odd-numbered frames are read from the first and second memory areas A1 and A2, the scanning line direction for the display image data for the odd-numbered frames is changed from the first scanning line direction to the second scanning line direction different from the first scanning line direction, and the display image data for odd-numbered frames is outputted. On the other hand, the display image data for even-numbered frames are written into the third memory area A3 different from the second memory area A2 and into the first memory area A1.

Further, when the display image data for even-numbered frames are read from the first and third memory areas A1 and A3, the scanning line direction for the display image data for the even-numbered frames is changed from the first scanning line direction to the second scanning line direction, and the display image data for even-numbered frames is outputted. On the other hand, the display image data for odd-numbered frames are written into the first and second memory areas A1 and A2.

With such an arrangement, while the display image data for an odd-numbered frame written in the first and second memory areas A1 and A2 is read from the video RAM 105, the second memory area A2 is prevented from being overwritten with the image data for the next even-numbered frame. On the other hand, when the image data for an even-numbered frame written in the first and third memory areas A1 and A3 is read from the video RAM 105, the third memory area A3 is prevented from being overwritten with the image data for the next odd-numbered frame. This suppresses the phenomenon in which the oblique line appears on the display screen when the scanning line direction of the moving image is changed in the image memory (in this instance, the video RAM 105).

For each frame constituting a moving image, one of the second and third memory areas A2 and A3 is specified exclusively and alternately as the memory area serving as the writing destination, and image data on a predetermined image area (in this instance, the second image area GA2) is written into the video RAM 105. The use of such an arrangement allows the effective use of a memory area of the video RAM 105 other than the memory area required for the writing of the image data on a single frame image constituting the moving image. This suppresses the phenomenon in which the oblique line appears on the display screen when the scanning line direction of the moving image is changed in the image memory without involving an excessive increase in the storage capacity of the image memory.

<Second Preferred Embodiment>

In the image display system 1 according to the first preferred embodiment of the present invention described above, the time (the reading start time) at which the image data for one frame starts being read from the video RAM 105 and the time (the writing start time) at which the image data for the next frame starts being written into the video RAM 105 are substantially simultaneous. An image display system 1A according to a second preferred embodiment of the present invention, on the other hand, achieves more effective use of the memory areas of the image memory by causing the reading start time to slightly precede the writing start time.

The image display system 1A according to the second preferred embodiment differs from the image display system 1 according to the first preferred embodiment in the relationship between the reading start time and the writing start time and in the size of the first to third memory areas A1 to A3, but is similar thereto in other constructions, functions and operations. For this reason, only the differences between the image display system 1A according to the second preferred embodiment and the image display system 1 according to the first preferred embodiment will be described below. Similar constructions and the like are designated by like reference numerals and characters and will not be described.

<Relationship between Reading/Writing Time and Size of Next Frame Containing Area>

The NTSC signal is an interlaced image signal with 525 scanning lines. Accordingly, an odd-numbered frame (field) and an even-numbered frame (field) based on the NTSC signal have an average of 262.5 (=525/2) scanning lines. The number of scanning lines (262.5 lines) is greater by 22.5 than the number of pixels (240) along the narrow side of the display section 200. Thus, the image data corresponding to the 22.5 lines is not used for the reproduction of the image data, but produces a time period (also referred to hereinafter as a "vertical retrace time") required for the scanning lines running horizontally from the upper left corner to the lower right corner to return to the upper left corner again. The vertical retrace time is wasted.

In displaying a moving image on the organic EL display as mentioned above, it is necessary to read the display image data for each frame constituting the moving image from the video RAM 105 after all of the display image data is written into the video RAM 105. Thus, the image data may start being read from the video RAM 105 at any time after all of the image data for the previous frame is written into the video RAM 105. However, as the reading start time gets later, the video RAM 105 is overwritten with successive pieces of display image data for the next frame before the display image data for the current frame is read from the video RAM 105, resulting in an increased likelihood that the oblique line appears. Thus, as the reading start time gets later, it is necessary to prepare a greater number of redundant memory areas separate from the memory areas required for the writing of the image data for one frame constituting the moving image.

A relationship between the reading start time and the position in which the oblique line appears on the moving image will be contemplated, assuming that only a memory area corresponding to 240 by 320 pixels in the address space of the video RAM 105 is used to display the moving image.

FIG. 22 is an illustration of the relationship between the reading start time and the position in which the oblique line appears. In FIG. 22, the area surrounded by thick lines indicates an area corresponding to each frame image constituting a moving image displayed in the display section 200. Broken lines indicate the position in which the oblique line appears, and the area shaded with hatch lines indicates an image area (the next frame containing area) Mn in which the next frame image is contained. The portion shaded with dots indicates an area of the 22.5 scanning lines corresponding to the vertical retrace time, that is, a non-image area WA. FIG. 22(a) shows an instance in which the reading start time and the writing start time are substantially simultaneous. FIG. 22(b) shows an instance in which the reading start time slightly precedes the writing start time. FIG. 22(c) shows an instance in which the reading start time slightly lags behind the writing start time.

When the reading start time and the writing start time are substantially simultaneous as shown in FIG. 22(a), the oblique line appears in the position of the Ht-th scanning line from the top relative to the total number of scanning lines He (=240 lines). On the other hand, when the reading start time is caused to precede the writing start time by a time period corresponding to Hp (e.g. 22.5) scanning lines, the area of the next frame containing area Mn is reduced. When the reading start time is caused to lag behind the writing start time by a time period corresponding to Hd scanning lines, the size of the next frame containing area Mn is increased.

Thus, the reading start time and the writing start time need not be simultaneous. The size of the next frame containing area Mn is held small by starting the reading of the display image data for the current frame from the video RAM 105 during a time period between the instant at which the writing of the display image data for the current frame into the video RAM 105 is completed and the instant at which the writing of the display image data for the next frame into the video RAM 105 is started.

<Reading/Writing Time and Memory Area Reduction>

In the image display system 1A according to the second preferred embodiment, image data on an odd-numbered frame image corresponding to the next frame containing area Mn is written into the second memory area A2, and image data on an even-numbered frame image corresponding to the next frame containing area Mn is written into the third memory area A3 in a manner similar to the above-mentioned first preferred embodiment.

In the image display system 1A, the display image data for an odd-numbered frame constituting a moving image starts being read from the video RAM 105 during a time period between the instant at which the process of writing the display image data for the odd-numbered frame constituting the moving image into the video RAM 105 is completed and the instant at which the process of writing the display image data for the next even-numbered frame constituting the moving image into the video RAM 105 is started under the control of the memory I/F 103. On the other hand, the display image data for an even-numbered frame constituting a moving image starts being read from the video RAM 105 during a time period between the instant at which the process of writing the display image data for the even-numbered frame into the video RAM 105 is completed and the instant at which the process of writing the display image data for next odd-numbered frame into the video RAM 105 is started under the control of the memory I/F 103.

In other words, the image data for an n-th frame (where n is a natural number) constituting a moving image starts being read from the video RAM 105 during a time period between the instant at which the process of writing the image data for the n-th frame constituting the moving image into the video RAM 105 is completed and the instant at which the process of writing the image data for the (n+1)-th frame constituting the moving image into the video RAM 105 is started under the control of the memory I/F 103.

Specifically, as shown in FIG. 22(*b*), the reading start time precedes the writing start time by a time period corresponding to Hp (e.g. 22.5) scanning lines. This decreases the area of the image area which can become the next frame containing area Mn to decrease the size (storage capacity) of the third memory area A3 which is required to be previously prepared for the suppression of the appearance of the oblique line.

Using the writing rate Vw, the reading rate Vr and the rate ratio N (=Vr/Vw), the storage capacity E of the third memory area A3 required for the suppression of the appearance of an oblique line when the reading start time precedes the writing start time, that is, when the relation of the following expression (1) holds is represented by the following relational expression (2).

$$0 \leq B' \leq B \leq (D/N) \quad (1)$$

$$E \leq (1/2N) \times \{(D/N) - B'\}/(D/N) \quad (2)$$

where D is the time required for the display image data on each display frame image read in accordance with the control of the memory I/F 103 to be written into the video RAM 105, B is the vertical retrace time, B' is the time period by which the start of the reading of the image data for the n-th frame (where n is a natural number) under the control of the memory I/F 103 precedes the start of the writing of the display image data for the (n+1)-th frame under the control of the memory I/F 103, and the total storage capacity of the first and second memory areas A1 and A2 has a reference value of 1.

The smaller the storage capacity E of the third memory area A3 required for the suppression of the appearance of the oblique line is, the smaller the storage capacity of the video RAM 105 can be. When the left side is equal to the right side in the above-mentioned expression (2), the storage capacity of the video RAM 105 is minimized.

As mentioned above, the average number of scanning lines (262.5 scanning lines) in an odd-numbered frame and an even-numbered frame based on the NTSC signal is greater by 22.5 than the number of pixels (240 pixels) in the vertical direction of the display section 200. Under such conditions, the minimum value of the storage capacity E of the third memory area A3 required for the suppression of the appearance of the oblique line is as follows: approximately 0.46 when, for example, the reading rate Vr and the writing rate Vw are approximately equal to each other (when N≈1); approximately 0.19 when the reading rate Vr is about twice higher than the writing rate Vw (when N≈2); approximately 0.10 when the reading rate Vr is about three times higher than the writing rate Vw (when N≈3); and approximately 0.06 when the reading rate Vr is about four times higher than the writing rate Vw (when N≈4).

<Operation of Changing Scanning Line Direction>

Figure 23:
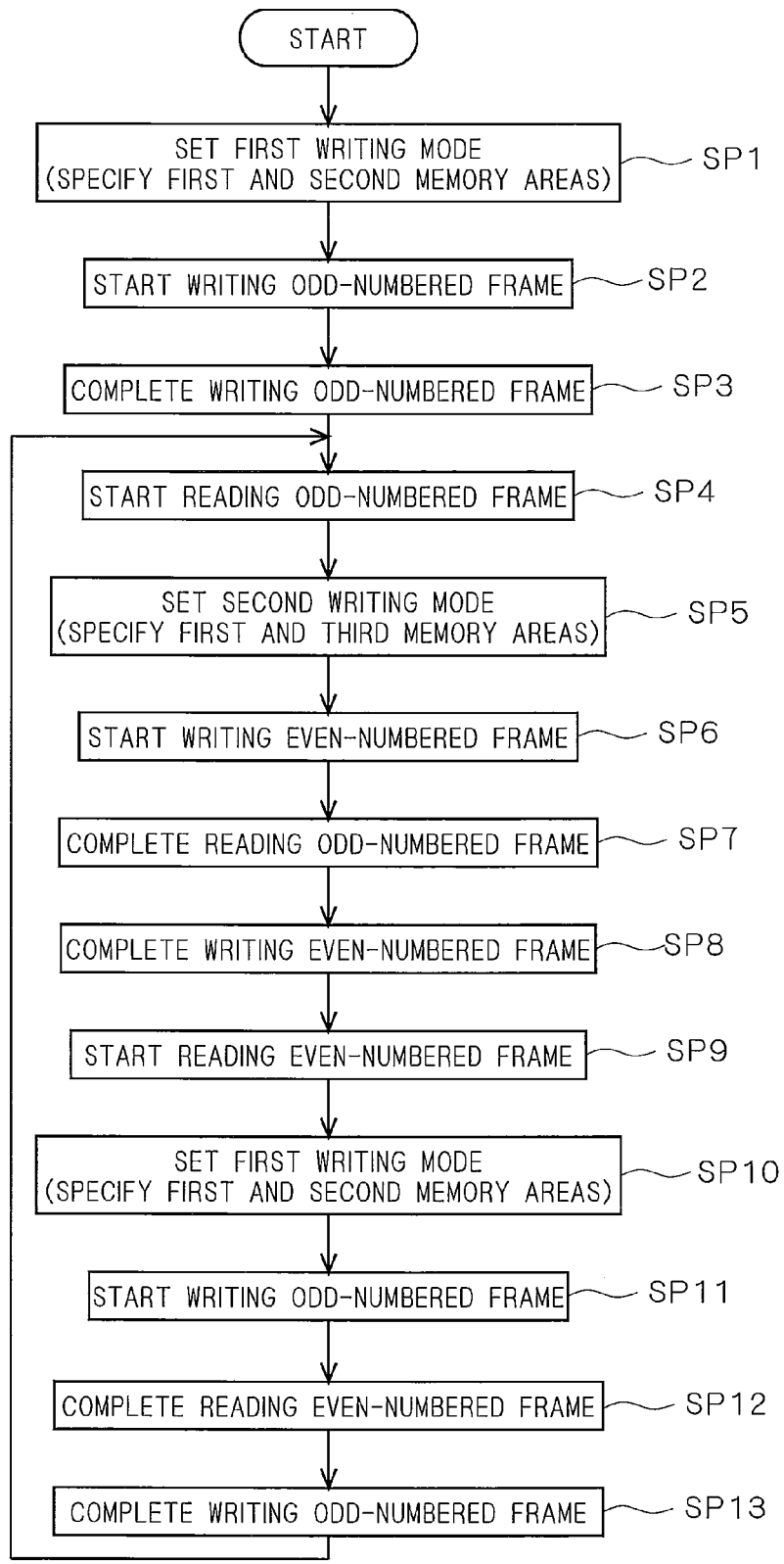
FIG. 23 is a flow chart for the operation of changing the scanning line direction according to a second preferred embodiment.

FIG. 23 is a flow chart related to the operation of changing the scanning line direction in the display controller 100. FIG. 24 is a timing chart related to the operation of changing the scanning line direction in the display controller 100. A timed relationship between the vertical synchronizing signal, the signal (the mode selection signal) for mode selection between the first and second writing modes, the writing of image data into the video RAM 105, and the reading of image data from the video RAM 105 in top-to-bottom order is shown in the timing chart of FIG. 24. In the timing chart of FIG. 24 is shown an instance in which the reading of the image data for one frame from the video RAM 105 is started at about the same time that the writing of the image data for the one frame into the video RAM 105 is completed.

The procedure of operation shown in FIG. 23 will be described with reference to the timing chart of FIG. 24. The procedure of operation shown in FIG. 23 is started in response to the input of the NTSC signal to the video I/F 101, and proceeds to Step SP1 of FIG. 23.

In Step SP1, the memory I/F 103 specifies the first and second memory areas A1 and A2 of the video RAM 105 as memory areas into which the display image data for odd-numbered frames are to be written (at time t21 of FIG. 24). In other words, the first writing mode is set.

In Step SP2, the memory I/F 103 starts the process of writing the display image data for an odd-numbered frame into the first and second memory areas A1 and A2 (at time t21 of FIG. 24).

In Step SP3, the writing of the display image data for the odd-numbered frame is completed (at time t22 of FIG. 24).

In Step SP4, the memory I/F 103 starts the process of reading the display image data for an odd-numbered frame stored in the first and second memory areas A1 and A2 of the video RAM 105 (at time t22 of FIG. 24).

In Step SP5, the memory I/F 103 specifies the first and third memory areas A1 and A3 of the video RAM 105 as memory areas into which the display image data for even-numbered frames are to be written (at time t23 of FIG. 24). In other words, the second writing mode is set.

In Step SP6, the memory I/F 103 starts the process of writing the display image data for an even-numbered frame into the first and third memory areas A1 and A3 (at time t23 of FIG. 24).

In Step SP7, the reading of the display image data for the odd-numbered frame is completed (at time t24 of FIG. 24).

In Step SP8, the writing of the image data for the even-numbered frame is completed (at time t25 of FIG. 24).

In Step SP9, the memory I/F 103 starts the process of reading the display image data for an even-numbered frame stored in the first and third memory areas A1 and A3 of the video RAM 105 (at time t25 of FIG. 24).

In Step SP 10, the first writing mode is set (at time t26 of FIG. 24).

In Step SP11, the memory I/F 103 starts the process of writing the display image data for an odd-numbered frame into the first and second memory areas A1 and A2 (at time t26 of FIG. 24).

In Step SP12, the reading of the display image data for the even-numbered frame is completed (at time t27 of FIG. 24).

In Step SP13, the writing of the display image data for the odd-numbered frame is completed (at time t28 of FIG. 24).

Thereafter, the procedure proceeds to Step SP4, and the processes in Steps SP4 to SP13 are repeated.

Although not shown in FIG. 23, the completion of the input of the NTSC signal to the video I/F 101 completes the procedure of operation of FIG. 23.

In the image display system 1A according to the second preferred embodiment of the present invention as described above, the image data for one frame constituting a moving image starts being read from the video RAM 105 during a time period between the instant at which the process of writing the image data for the one frame constituting the moving image into the video RAM 105 is completed and the instant at which the process of writing the image data for the next frame constituting the moving image into the video RAM 105 is started. The use of such an arrangement further reduces the storage capacity of the image memory required for the suppression of the phenomenon in which the oblique line appears on the display screen when the scanning line direction of the moving image is changed in the image memory (in this case, the video RAM 105).

The use of conditions such that the relations of the above-mentioned expressions (1) and (2) hold minimizes the storage capacity of the image memory required for the suppression of the phenomenon in which the oblique line appears on the display screen when the scanning line direction of the moving image is changed in the image memory (in this case, the video RAM 105). More specifically, the smaller the storage capacity E of the third memory area A3 required for the suppression of the appearance of the oblique line within the range in which the above-mentioned expressions (1) and (2) are satisfied, the smaller the storage capacity of the video RAM 105. When the condition that the left side and the right side are equal to each other in the above-mentioned expression (2) is set, the storage capacity of the video RAM 105 is minimized.

In this manner, the second preferred embodiment devises the way to reduce the storage capacity of the video RAM 105 to the extent that the appearance of the oblique line can be suppressed to thereby meet the requirements for the reductions in size and manufacturing costs of electronic devices.

<Modifications>

The present invention is not limited to the above-mentioned preferred embodiments, but various modifications, improvements and the like may be made without departing from the spirit and scope of the invention.

For example, the above-mentioned preferred embodiments take as an example the organic EL display which reads image data for each frame from the image memory after the completion of the writing of the image data for each frame into the image memory. The present invention, however, is not limited to this, but is applicable to an organic EL display which simultaneously writes and reads the image data into and from an image memory. The organic EL display of the latter type, however, is disadvantageous in the increase in the storage capacity of the memory to be increased because its low reading rate relative to the writing rate increases the image area serving as the next frame containing area due to the appearance of the oblique line.

The instance in which N≈3 is given for description in the above-mentioned preferred embodiments. The present invention, however, is not limited to this. N may take other values such as N≈4. The greater value N takes, the smaller the storage capacity of the image memory to be prepared redundantly is required. It is preferable that N≥3.

The above-mentioned preferred embodiments take the organic EL display as an example of the display section 200. The present invention, however, is not limited to this, but may be applied to various image display devices which mount thereon other display sections such as a plasma display (PDP), a liquid crystal display (LCD) and an inorganic EL display to thereby produce effects similar to those of the above-mentioned preferred embodiments. In particular, the present invention is effective for the suppression of the oblique line which becomes obvious in a self light emitting display having a relatively high response speed (for example, an image display device of a self light emitting type having a response speed of not greater than 1000 μsec). The appearance of the oblique line which will become obvious due to the increase in response speed associated with future improvements in performance in an LCD having a relatively low response speed is also suppressed.

In the above-mentioned preferred embodiments, the single image memory (the video RAM 105) is mounted in the image display devices 1 and 1A, and the image data for each frame is written into and read from the single image memory. The present invention, however, is not limited to this. An image display device may include a plurality of image memories mounted therein, and image data for each frame may be written into and read from the plurality of image memories. From the viewpoint of reducing manufacturing costs, it is preferable that the number of image memories is smaller, and it is more preferable that only one image memory is provided.

The portable telephone 10 in which the display controller 100 and the display section 200 are integrally formed is illustrated in the above-mentioned preferred embodiments. However, the technique according to the present invention is applicable to a system in which the display controller 100 is configured as a display control device separate from the display section 200.

The portable telephone 10 receives an image signal to reproduce the image signal in the above-mentioned preferred embodiments. The present invention, however, is not limited to this. The technique according to the present invention is applicable to general electronic devices mounting thereon a display capable of displaying a moving image such as portable terminal devices including PDAs (Personal digital Assistants) and the like.

In the above-mentioned preferred embodiments, the second memory area A2 is used only when storing the display image data for odd-numbered frames, and the third memory area A3 is used only when storing the display image data for even-numbered frames. The present invention, however, is not limited to this. For instance, the third memory area A3 may be used only when storing the display image data for odd-numbered frames whereas the second memory area A2 be used only when storing the display image data for even-numbered frames, in which case effects similar to those of the above-mentioned preferred embodiments are produced. Further, the second memory area A2 and the third memory area A3 may be interchanged with each other.

In the above-mentioned preferred embodiments, the functional components included in the display controller 100 are illustrated as implemented by hardware components. The present invention, however, is not limited to this. For example, the functional components may be implemented by cooperation between the hardware components and software.

The present invention is applicable to general techniques for reproducing moving images related to digital terrestrial broadcasting expected to become widely available in the future in various mobile devices such as portable telephones and the like.

While the invention has been shown and described in detail, the foregoing description is in all aspects illustrative and not restrictive. It is therefore understood that numerous modifications and variations can be devised without departing from the scope of the invention.

The invention claimed is:

1. An image display device comprising:
   a storage portion configured to store image data for a first frame constituting a moving image and for a second frame subsequent to the first frame, and having first to third memory areas;
   a writing portion configured to write the image data for said first frame into said first and second memory areas and to write the image data for said second frame into said first and third memory areas but not into said second memory area even though the image data for said second frame is identical with the image data for said first frame;
   a reading portion configured to read the image data for said first frame from said first and second memory areas and to read the image data for said second frame from said first and third memory areas, said reading portion changing a scanning line direction for the image data for said first and second frames to be read to a second scanning line direction different from a first scanning line direction that is a scanning line direction for said image data prior to the writing into said storage portion; and
   a display portion configured to output the image data for said first and second frames read by said reading portion in time sequence in a visible manner.

2. The image display device according to claim 1, wherein said second and third memory areas are in non-overlapping relation to each other.

3. The image display device according to claim 1, wherein said first frame is an odd-numbered frame and said second frame is an even-numbered frame, and
   said writing portion writes the image data into said second and third memory areas alternately.

4. The image display device according to claim 1, wherein said second memory area and said third memory area into which said image data are actually written are equal in storage capacity to each other.

5. The image display device according to claim 1, wherein said first to third memory areas are disposed within a single image memory.

6. The image display device according to claim 1, wherein said reading portion starts to read the image data for said first frame written in said storage portion during a time period between the instant at which said writing portion completes the process of writing the image data for said first frame into said storage portion and the instant at which said writing portion starts the process of writing the image data for said second frame into said storage portion.

7. The image display device according to claim 6, wherein the following relationships are satisfied:

$$N = (Vr/Vw) \quad (I)$$

$$0 \leq B' \leq B < (D/N) \quad (II)$$

$$E \leq (1/2N) \times \{(D/N) - B'\}/(D/N) \quad (III)$$

where Vw is a rate at which said writing portion writes the image data for said first and second frames into said storage portion, Vr is a rate at which said reading portion reads the image data for said first and second frames from said storage portion, D is a time period over which the image data for said first and second frames read from said storage portion by said reading portion are written into said storage portion by said writing portion, B is a vertical retrace time during the writing of the image data for said first and second frames into said storage portion by said writing portion, B' is a time period by which the start of the reading of the image data for the first frame from said storage portion by said reading portion precedes the start of the writing of the image data for said second frame into said storage portion by said writing portion, E is the storage capacity of said third memory area, and the total storage capacity of said first and second memory areas is 1.

8. The image display device according to claim 1, wherein said first scanning line direction and said second scanning line direction are substantially orthogonal to each other.

9. The image display device according to claim 1, wherein said display portion has a light emitting device of a self light emitting type.

10. The image display device according to claim 9, wherein said light emitting device has a response speed of not greater than 1000 μsec.

11. An electronic device comprising an image display device as recited in claim 1.

12. The electronic device according to claim 11, wherein said display portion includes a display having a rectangular shape with narrow side and a long side, and a data driver disposed along said narrow side of the display, said image data read from said memory areas being supplied to the data driver.

13. A display controller for controlling the display of a moving image, comprising:
   a storage portion configured to store image data for a first frame constituting the moving image and for a second frame subsequent to the first frame, and having first to third memory areas;
   a writing portion configured to write the image data for said first frame into said first and second memory areas and to write the image data for said second frame into said first and third memory areas but not into said second memory area even though the image data for said second frame is identical with the image data for said first frame; and
   a reading portion configured to reading the image data for said first frame from said first and second memory areas and to read the image data for said second frame from said first and third memory areas, said reading portion changing a scanning line direction for the image data for said first and second frames to a second scanning line direction different from a first scanning line direction that is a scanning line direction for said image data prior to the writing to said storage portion.

14. A method of controlling the display of a moving image, comprising:
   preparing a storage portion having first to third memory areas;
   writing image data for a first frame constituting the moving image into said first and second memory areas in a first direction;
   while reading the image data for said first frame from said first and second memory areas in a second direction different from said first direction, writing image data for a second frame subsequent to said first frame into said first and third memory areas of said storage portion in said first direction; and
   while reading the image data for said second frame from said first and third memory areas in said second direction, writing image data for a third frame subsequent to said second frame into said first and second memory areas in said first direction,
   wherein the image data for said second frame is not written into said second memory area even though the image data for said second frame is identical with the image data for said first frame, and wherein the image data for said third frame is not written into said third memory area even though the image data for said third frame is identical with the image data for said second frame.

\* \* \* \* \*